(12) United States Patent
Uematsu et al.

(10) Patent No.: US 11,619,890 B2
(45) Date of Patent: Apr. 4, 2023

(54) ELECTRO-CONDUCTIVE MEMBER, MANUFACTURING METHOD THEREOF, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Atsushi Uematsu, Shizuoka (JP); Takumi Furukawa, Shizuoka (JP); Takashi Hiramatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/658,755

(22) Filed: Apr. 11, 2022

(65) Prior Publication Data

US 2022/0236662 A1 Jul. 28, 2022

Related U.S. Application Data

(63) Continuation of application No. PCT/JP2020/038284, filed on Oct. 9, 2020.

(30) Foreign Application Priority Data

Oct. 18, 2019 (JP) .............................. JP2019-191553

(51) Int. Cl.
*G03G 15/02* (2006.01)

(52) U.S. Cl.
CPC ... *G03G 15/0233* (2013.01); *G03G 2221/183* (2013.01)

(58) Field of Classification Search
CPC ................. G03G 15/0233; G03G 2221/183
See application file for complete search history.

(56) References Cited

U.S. PATENT DOCUMENTS 7,693,457 B2    4/2010    Kuruma et al.
7,797,833 B2    9/2010    Nakamura et al.
(Continued)

FOREIGN PATENT DOCUMENTS

JP    2-18578 A    1/1990
JP    5-72889 A    3/1993
(Continued)

OTHER PUBLICATIONS

U.S. Appl. No. 17/658,685, Masaki Yamada, filed Apr. 11, 2022.
(Continued)

*Primary Examiner* — Ryan D Walsh
(74) *Attorney, Agent, or Firm* — Venable LLP

(57) ABSTRACT

The electro-conductive member has an electro-conductive support, and an electro-conductive layer, in which the electro-conductive layer has a matrix including a first rubber cross-linked product and domains dispersed in the matrix, each of the domains includes a second rubber cross-linked product and electro-conductive particles, an outer surface of the electro-conductive member has concave portions, a surface of at least a part of the domains is exposed to the outer surface of the electro-conductive member at bottom portions of the concave portions, a volume resistivity of the matrix is greater than $1 \times 10^{12}$ Ωcm, a volume resistivity of the electro-conductive layer is $1 \times 10^5$ Ωcm to $1 \times 10^8$ Ωcm, and A2 is 20 times or more of A1.

7 Claims, 10 Drawing Sheets

(56) References Cited

U.S. PATENT DOCUMENTS

| | | |
|---|---|---|
| 7,799,398 B2 | 9/2010 | Nakamura et al. |
| 7,962,068 B2 | 6/2011 | Kuroda et al. |
| 8,298,670 B2 | 10/2012 | Muranaka et al. |
| 8,445,113 B2 | 5/2013 | Furukawa et al. |
| 8,449,975 B2 | 5/2013 | Hirakoso et al. |
| 8,600,273 B2 | 12/2013 | Yamada et al. |
| 8,622,881 B1 | 1/2014 | Harada et al. |
| 8,628,854 B2 | 1/2014 | Yamauchi et al. |
| 8,655,222 B2 | 2/2014 | Nakamura et al. |
| 8,668,987 B2 | 3/2014 | Yamauchi et al. |
| 8,685,601 B2 | 4/2014 | Nose et al. |
| 8,706,011 B2 | 4/2014 | Anan et al. |
| 8,715,830 B2 | 5/2014 | Yamada et al. |
| 8,768,226 B2 | 7/2014 | Koyanagi et al. |
| 8,768,227 B2 | 7/2014 | Urushihara et al. |
| 8,771,818 B2 | 7/2014 | Nishioka et al. |
| 8,774,677 B2 | 7/2014 | Sakurai et al. |
| 8,798,508 B2 | 8/2014 | Yamada et al. |
| 8,837,985 B2 | 9/2014 | Ishida et al. |
| 8,846,287 B2 | 9/2014 | Yamada et al. |
| 8,852,743 B2 | 10/2014 | Kikuchi et al. |
| 8,874,007 B2 | 10/2014 | Kawamura et al. |
| 8,874,012 B2 | 10/2014 | Yamada et al. |
| 8,913,930 B2 | 12/2014 | Ishii et al. |
| 8,991,053 B2 | 3/2015 | Watanabe et al. |
| 9,023,465 B2 | 5/2015 | Yamada et al. |
| 9,086,643 B2 | 7/2015 | Kikuchi et al. |
| 9,128,403 B2 | 9/2015 | Yamauchi et al. |
| 9,146,482 B2 | 9/2015 | Watanabe et al. |
| 9,360,789 B1 | 6/2016 | Masu et al. |
| 9,360,833 B2 | 6/2016 | Terada et al. |
| 9,442,408 B2 | 9/2016 | Yamauchi et al. |
| 9,442,451 B2 | 9/2016 | Yamauchi et al. |
| 9,541,854 B2 | 1/2017 | Kikuchi et al. |
| 9,547,250 B2 | 1/2017 | Kikuchi et al. |
| 9,551,949 B2 | 1/2017 | Yamauchi et al. |
| 9,581,931 B2 | 2/2017 | Yamada et al. |
| 9,599,913 B2 | 3/2017 | Nishioka et al. |
| 9,639,009 B2 | 5/2017 | Yamaguchi et al. |
| 9,651,888 B2 | 5/2017 | Muranaka et al. |
| 9,665,028 B2 | 5/2017 | Arimura et al. |
| 9,665,029 B2 | 5/2017 | Hino et al. |
| 9,740,133 B2 | 8/2017 | Yamauchi et al. |
| 9,811,009 B2 | 11/2017 | Yamada et al. |
| 9,811,021 B2 | 11/2017 | Muranaka et al. |
| 9,897,931 B2 | 2/2018 | Nishioka et al. |
| 9,904,199 B2 | 2/2018 | Terada et al. |
| 9,910,379 B2 | 3/2018 | Furukawa et al. |
| 9,958,802 B2 | 5/2018 | Kikuchi et al. |
| 9,964,914 B2 | 5/2018 | Arimura et al. |
| 9,977,353 B2 | 5/2018 | Nishioka et al. |
| 9,977,359 B2 | 5/2018 | Koyanagi et al. |
| 10,018,927 B2 | 7/2018 | Yamada et al. |
| 10,018,934 B2 | 7/2018 | Yamada et al. |
| 10,108,129 B2 | 10/2018 | Yamaguchi et al. |
| 10,146,149 B2 | 12/2018 | Watanabe et al. |
| 10,197,930 B2 | 2/2019 | Yamada et al. |
| 10,280,148 B2 | 5/2019 | Nishioka et al. |
| 10,303,079 B2 | 5/2019 | Utsuno et al. |
| 10,317,811 B2 | 6/2019 | Tomomizu et al. |
| 10,331,054 B2 | 6/2019 | Urushihara et al. |
| 10,379,460 B2 | 8/2019 | Arimura et al. |
| 10,416,588 B2 | 9/2019 | Masu et al. |
| 10,545,453 B2 | 1/2020 | Iwasaki et al. |
| 10,558,136 B2 | 2/2020 | Furukawa et al. |
| 10,649,350 B2 | 5/2020 | Yamaguchi et al. |
| 10,663,913 B2 | 5/2020 | Yamaai et al. |
| 10,678,154 B2 | 6/2020 | Takashima et al. |
| 10,678,158 B2 | 6/2020 | Kikuchi et al. |
| 10,845,724 B2 | 11/2020 | Kikuchi et al. |
| 10,884,352 B2 | 1/2021 | Yamada et al. |
| 10,996,581 B2 | 5/2021 | Muranaka et al. |
| 11,022,904 B2 | 6/2021 | Arimura et al. |
| 11,061,342 B2 | 7/2021 | Umeda et al. |
| 11,112,718 B2 | 9/2021 | Uno et al. |
| 11,112,719 B2 | 9/2021 | Makisumi et al. |
| 11,112,748 B2 | 9/2021 | Yamada et al. |
| 11,137,716 B2 | 10/2021 | Hiyama et al. |
| 11,169,454 B2 | 11/2021 | Nishioka et al. |
| 11,169,464 B2 | 11/2021 | Komatsu et al. |
| 11,175,602 B2 | 11/2021 | Nishioka et al. |
| 11,307,509 B2 | 4/2022 | Hino et al. |
| 11,320,756 B2 | 5/2022 | Kototani et al. |
| 11,340,553 B2 | 5/2022 | Watariguchi et al. |
| 11,347,156 B2 | 5/2022 | Kurachi et al. |
| 11,360,405 B2 | 6/2022 | Tomono et al. |
| 11,360,426 B2 | 6/2022 | Suzumura et al. |
| 11,366,402 B2 | 6/2022 | Ishiduka et al. |
| 2002/0022142 A1 | 2/2002 | Harada |
| 2012/0308261 A1 | 12/2012 | Tsuru et al. |
| 2013/0281276 A1 | 10/2013 | Watanabe et al. |
| 2015/0331346 A1 | 11/2015 | Yamauchi et al. |
| 2018/0101106 A1 | 4/2018 | Takeno |
| 2019/0324379 A1 | 10/2019 | Furukawa |
| 2020/0225593 A1 | 7/2020 | Yamaguchi et al. |
| 2021/0033996 A1 | 2/2021 | Kikuchi et al. |
| 2021/0116826 A1 | 4/2021 | Nishida et al. |
| 2021/0116827 A1 | 4/2021 | Fukudome et al. |
| 2021/0116831 A1 | 4/2021 | Tominaga et al. |
| 2021/0116856 A1* | 4/2021 | Mukai ............... G03G 5/0553 |
| 2021/0116859 A1 | 4/2021 | Unno et al. |
| 2022/0011684 A1 | 1/2022 | Nishioka et al. |
| 2022/0026825 A1 | 1/2022 | Nishioka et al. |
| 2022/0146958 A1* | 5/2022 | Higuchi ........... G03G 15/0233 |
| 2022/0229376 A1* | 7/2022 | Segawa ................ C08K 3/22 |

FOREIGN PATENT DOCUMENTS

| | | |
|---|---|---|
| JP | 2002-3651 A | 1/2002 |
| JP | 2018-63423 A | 4/2018 |
| JP | 2019-124900 A | 7/2019 |
| JP | 2019-191564 A | 10/2019 |
| WO | WO-2022097743 A1 * | 5/2022 |

OTHER PUBLICATIONS

U.S. Appl. No. 17/658,696, Kenji Takashima, filed Apr. 11, 2022.
U.S. Appl. No. 17/711,229, Shota Kaneko, filed Apr. 1, 2022.
U.S. Appl. No. 17/806,015, Yuichi Kikuchi, Jun. 8, 2022.

* cited by examiner

ELECTRO-CONDUCTIVE MEMBER, MANUFACTURING METHOD THEREOF, PROCESS CARTRIDGE, AND ELECTROPHOTOGRAPHIC IMAGE FORMING APPARATUS

CROSS-REFERENCE TO RELATED APPLICATIONS

This application is a Continuation of International Patent Application No. PCT/JP2020/038284, filed Oct. 9, 2020, which claims the benefit of Japanese Patent Application No. 2019-191553, filed Oct. 18, 2019, both of which are hereby incorporated by reference herein in their entirety.

BACKGROUND

Technical Field

The present disclosure provides an electrophotographic electro-conductive member used as a charging member, a developing member, or a transfer member in an electrophotographic image forming apparatus, a process cartridge, and an electrophotographic image forming apparatus.

Description of the Related Art

Electro-conductive members such as charging members, transfer members, and developing members are used in electrophotographic image forming apparatuses (also referred to below as "electrophotographic apparatuses"). As electro-conductive members, electro-conductive members with a configuration having an electro-conductive support and an electro-conductive layer provided on the support are known. The electro-conductive member transports an electric charge from the electro-conductive support to the surface of the electro-conductive member and plays a role of applying the electric charge to a contact object by discharge or frictional charging.

A charging member is a member which generates a discharge between itself and an electrophotographic photosensitive member (also referred to below as a "photosensitive member") to charge the photosensitive member surface. A developing member is a member which controls the electric charge of a developer coated on the surface thereof by frictional charging, provides a uniform charging quantity distribution, and then transfers the developer uniformly to the surface of the electrophotographic photosensitive member according to the applied electric field. In addition, a transfer member is a member which transfers a developer from an electrophotographic photosensitive member to a printing medium or an intermediate transfer body and at the same time generates a discharge to stabilize the developer after the transfer.

These electro-conductive members have to achieve uniform charging of the electrophotographic photosensitive member and contact objects, such as an intermediate transfer body or a printing medium, respectively, and it is preferable to use roller-shaped electro-conductive members.

As a charging member for contact charging, Japanese Patent Application Laid-Open No. 2002-3651 describes a charging member including a rubber composition with a sea-island structure including a polymer continuous phase formed of an ion-conductive rubber material and a polymer particle phase formed of an electrically conductive rubber material, in which the ion-conductive rubber material is mainly formed of a raw material rubber A having a volume specific resistivity of $1 \times 10^{12}$ Ω·cm or less and the electrically conductive rubber material is imparted with conductivity by blending a raw material rubber B with electro-conductive particles.

According to research by the present inventors, although the charging member according to Japanese Patent Application Laid-Open No. 2002-3651 has a uniform and stable electrical resistance value, the discharge stability may not be sufficient for recent image forming processes configured for high-speed. Specifically, when the charging member according to Japanese Patent Application Laid-Open No. 2002-3651 is used for forming electrophotographic images, minute potential unevenness formed on the surface of the object for charging cannot be sufficiently equalized before the charging step and an electrophotographic image (also referred to below as a "ghost image") may be formed, in which an image which was not originally to be formed appears superimposed on the original image, due to the potential unevenness.

SUMMARY

At least one aspect of the present disclosure is directed to providing an electro-conductive member which can stably form a high-quality image even in a case of being applied to a high-speed electrophotographic image forming process. In addition, other aspects of the present disclosure are directed to providing a method for manufacturing the electro-conductive member, as well as a process cartridge and an electrophotographic image forming apparatus which contribute to the formation of high-quality electrophotographic images.

According to one aspect of the present disclosure, there is provided an electro-conductive member which includes an electro-conductive support, and an electro-conductive layer, in which the electro-conductive layer is a surface layer of the electrophotographic member, and is constituted by a single layer, the electro-conductive layer has a matrix including a first rubber cross-linked product and domains dispersed in the matrix, each of the domains includes a second rubber cross-linked product and electro-conductive particles, an outer surface of the electro-conductive member has concave portions, a surface of at least a part of the domains is exposed to the outer surface of the electro-conductive member at bottom portions of the concave portions, a volume resistivity of the matrix is greater than $1.0 \times 10^{12}$ Ωcm, a volume resistivity of the electro-conductive layer is $1.0 \times 10^{5}$ Ωcm or more to $1.0 \times 10^{8}$ Ωcm or less, and A2 is 20 times or more of A1, where A1 is a current value when a DC voltage of 80 V is applied between the electro-conductive support and a cantilever of an atomic force microscope which is in contact with a surface of the matrix, constituting the outer surface of the electro-conductive member, and A2 is a current value when a DC voltage of 80 V is applied between the electro-conductive support and a cantilever of an atomic force microscope which is in contact with surfaces of the domains, constituting the outer surface of the electro-conductive member According to another aspect of the present disclosure, there is provided an electrophotographic image forming apparatus which includes an electrophotographic photosensitive member and a charging member arranged to enable charging of the electrophotographic photosensitive member, in which the charging member is the electro-conductive member described above.

According to another aspect of the present disclosure, there is provided an electrophotographic process cartridge which is attachable to and detachable from a main body of an electrophotographic image forming apparatus, including the electro-conductive member described above.

According to still another aspect of the present disclosure, there is provided a method for manufacturing the electro-conductive member described above, including the following steps (A) to (D): (A) providing a rubber composition for forming a domain including the electro-conductive particles and the second rubber, (B) providing a rubber composition for forming a matrix including the first rubber, (C) kneading the rubber composition for forming a domain and the rubber composition for forming a matrix to prepare a rubber composition having a matrix-domain structure, and (D) extruding the rubber composition having the matrix-domain structure together with an electro-conductive support from a crosshead to coat a periphery of the electro-conductive support with the rubber composition having the matrix-domain structure, in which, a ratio of die swell values DS(m)/DS(d) is greater than 1.0, where DS(d) is a die swell value of the rubber composition for forming a domain, and DS(m) is a die swell value of the rubber composition for forming a matrix.

Further features of the present disclosure will become apparent from the following description of exemplary embodiments with reference to the attached drawings.

DESCRIPTION OF THE EMBODIMENTS

According to research by the present inventors, when evaluating the charging member according to Japanese Patent Application Laid-Open No. 2002-3651, the ghost images described above were sometimes generated in main bodies configured for high-speed as described above.

The mechanism for the generation of the ghost images is presumed to be as follows.

Figure 1A:
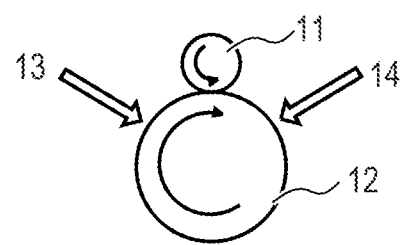
FIG. 1A is a diagram illustrating surface potential unevenness.
Figure 1B:
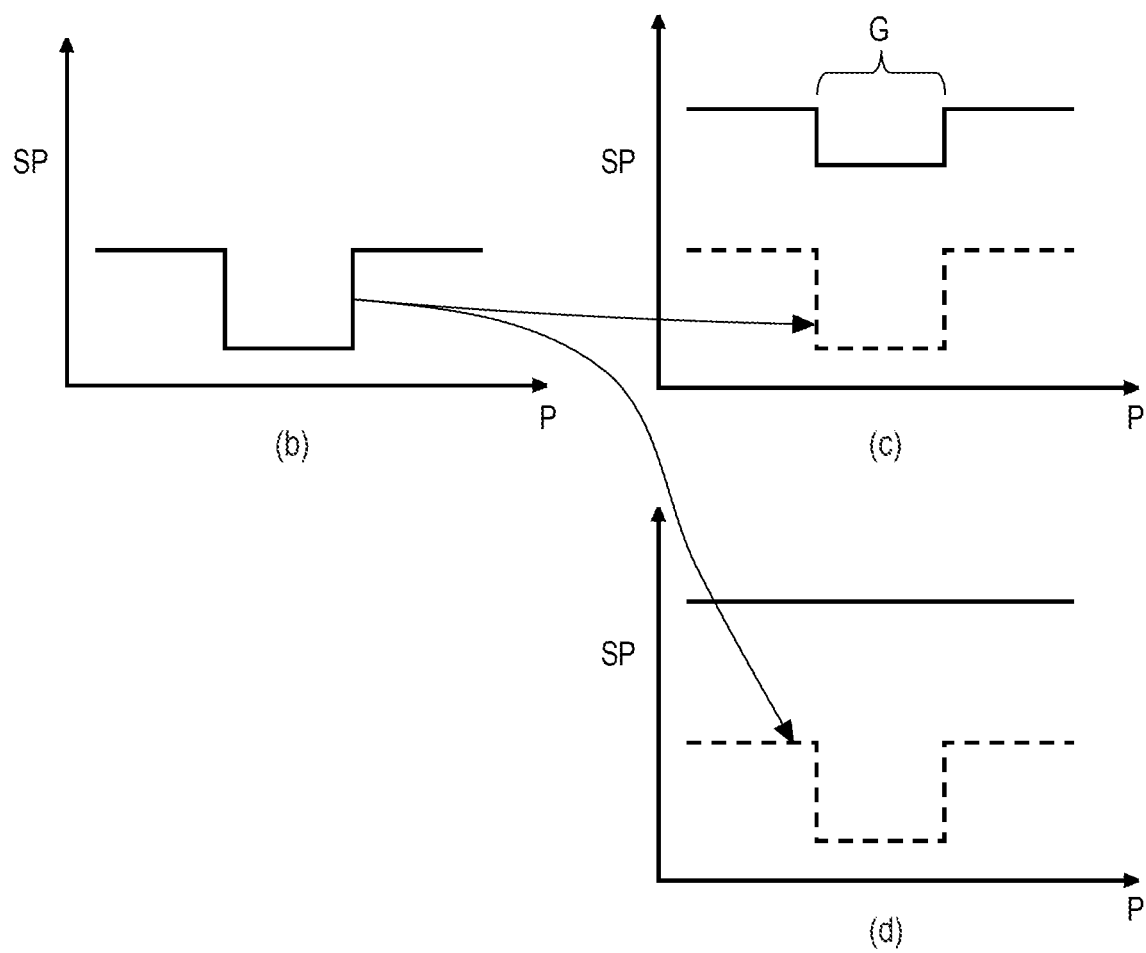
FIG. 1B is a diagram illustrating surface potential unevenness.

FIGS. 1A and 1B illustrate the phenomenon of ghost image generation. FIG. 1A illustrates a schematic diagram of an electrophotographic process, in which an electrophotographic photosensitive member (also referred to below as a "photosensitive drum") 12 is arranged in contact with a charging member 11 which charges the photosensitive drum 12. Arrow 13 indicates the measurement position of the surface potential of the photosensitive drum before charging and arrow 14 indicates the measurement position of the surface potential of the photosensitive drum after charging. (b) in FIG. 1B represents the change (potential profile) in surface potential of the photosensitive drum at the measurement position 13 and (c) and (d) in FIG. 1B represent the change (potential profile) in surface potential of the photosensitive drum at the measurement position 14. In the graph in FIG. 1B, the vertical axis signifies a surface potential (SP) and the horizontal axis signifies a measurement position (P).

In (c) and (d) in FIG. 1B, the dashed line is the potential profile before charging illustrated in (b) in FIG. 1B. Normally, after the transfer step, the photosensitive drum 12 before charging in the next image forming step has a potential unevenness derived from an electrostatic latent image formed in the previous image forming step. When such potential unevenness cannot be equalized in the next charging step, the potential unevenness as illustrated by the solid line in (c) in FIG. 1B remains and a ghost (G) image is generated. Accordingly, it is important to sufficiently equalize the potential unevenness on the surface of the photosensitive drum in the next charging step to prevent the generation of ghost images.

However, it is considered that the charging member according to Japanese Patent Application Laid-Open No. 2002-3651 cannot sufficiently impart an electric charge to the photosensitive drum in a process configured for high-speed.

On the other hand, the electro-conductive member according to the present disclosure can equalize the surface potential of the photosensitive drum, which is the potential unevenness illustrated in (b) in FIG. 1B, as illustrated by the solid line in (d) in FIG. 1B.

The electro-conductive member according to the present disclosure will be described.

The electro-conductive member has an electro-conductive support and an electro-conductive layer. The electro-conductive layer is a surface layer constituted by a single layer and has a matrix including a first rubber cross-linked product and a plurality of domains dispersed in the matrix, in which each of the domains includes a second rubber cross-linked product and electro-conductive particles. In order to form a matrix-domain structure (also referred to as a sea-island structure), the first rubber and the second rubber are preferably different materials.

The outer surface of the electro-conductive member has a plurality of concave portions, and a surface(s) of at least a part of the domains is exposed to the outer surface of the electro-conductive member at the bottom portions of the concave portions.

The volume resistivity of the matrix is greater than $1.0 \times 10^{12}$ Ωcm and the volume resistivity of the electro-conductive layer is $1.0 \times 10^{5}$ Ωcm or more to $1.0 \times 10^{8}$ Ωcm or less.

Here, a current value when a DC voltage of 80 V is applied between the electro-conductive support of the electro-conductive member and the cantilever of an atomic force microscope in contact with the surface of the matrix which forms the surface of the electro-conductive member is denoted by A1. In addition, a current value when a DC voltage of 80 V is applied between the electro-conductive support and the cantilever of an atomic force microscope in contact with the surface of the domain which forms the surface of the electro-conductive member is denoted by A2. A2 is 20 times or more of A1.

In the electro-conductive member according to the present aspect, domains formed of a second rubber cross-linked product and electro-conductive particles are dispersed in a matrix formed of a first rubber cross-linked product and the volume resistivity of the matrix is greater than $1.0 \times 10^{12}$ Ωcm.

The present inventors speculate that the reason why the electro-conductive member having the configuration described above can equalize, as illustrated in (d) in FIG. 1B, the potential unevenness as illustrated in (b) in FIG. 1B is as follows.

Figure 4A:
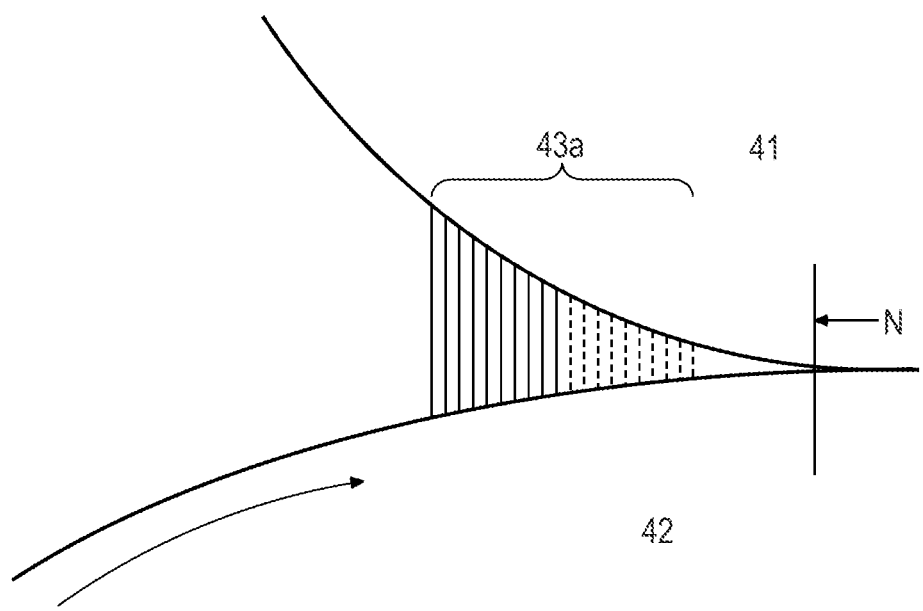
FIG. 4A is a diagram illustrating a discharge region.
Figure 4B:
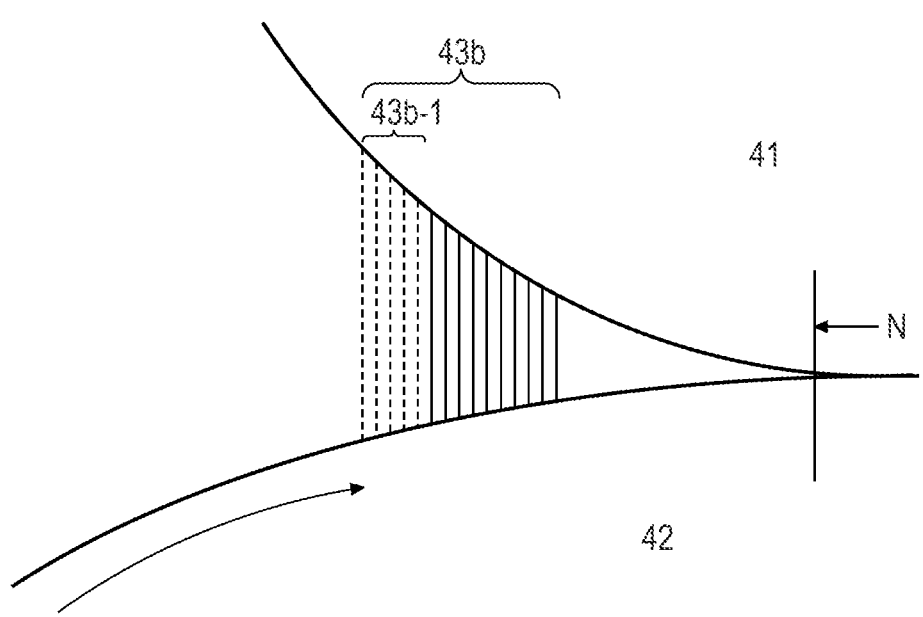
FIG. 4B is a diagram illustrating the discharge region.

That is, so-called contact charging uses a discharge generated from the surface of a charging member toward the surface of a photosensitive drum in a void in the vicinity of a contact portion between the charging member and the photosensitive member, in a discharge region where the relationship between the intensity of the electric field and the distance of the void satisfies Paschen's law. Here, in a region downstream of the discharge region, which is closer to the contact portion, the difference in surface potential between the charging member and the photosensitive drum is smaller, thus, it is harder to generate a discharge from the charging member. In particular, in a case where the amount of electric charge released by one discharge is large, it is considered that the surface potential of the photosensitive drum after the charging step is governed in practice by the discharge in an upstream region 43b-1 separated from a contact portion (N) of a discharge region 43b illustrated in FIG. 4B. In FIGS. 4A and 4B, 41 is a photosensitive drum and 42 is an electro-conductive member as a charging member.

On the other hand, the electro-conductive member of the present disclosure can reduce the amount of electric charge released by one discharge for the reasons described below. Therefore, even downstream of the discharge region, the potential difference between the charging member and the photosensitive drum is maintained to some extent. Additionally, the domain which is the discharge point is present at the bottom portion of the concave portion and, due to this, a gap between the discharge point and the surface of the photosensitive drum can be secured even at a position closer to the contact portion and the discharge to the photosensitive drum can be made to continue even at the position nearest the contact portion. As a result, as illustrated in FIG. 4A, it is considered that a discharge region 43a can be expanded and the total amount of electric charge imparted to the photosensitive drum can be increased.

The reason why the electro-conductive member according to the present disclosure enables fine discharge will be described below.

When a charging bias is applied in the electro-conductive layer between the support of the electro-conductive member and the electrophotographic photosensitive member, it is considered that the electric charge is transferred from the support side of the electro-conductive layer to the opposite side, that is, the outer surface side of the electro-conductive member, in the following manner. That is, the electric charge is accumulated in the vicinity of the interface between the matrix and the domain.

Then, the electric charge is sequentially passed from the domain positioned on the electro-conductive support side to the domain positioned on the opposite side to the electro-conductive support side and reaches the surface (also referred to below as the "outer surface of the electro-conductive layer") of the electro-conductive layer on the opposite side to the electro-conductive support side. At this time, when all the domain electric charges are transferred to the outer surface side of the electro-conductive layer in one charging step, time is needed to accumulate electric charges in the electro-conductive layer for the next charging step. In this manner, it is difficult to achieve stable discharge in a high-speed electrophotographic image forming process.

Accordingly, it is preferable that the transferring and receiving of electric charges between domains does not occur simultaneously even when a charging bias is applied. In addition, since the transfer of the electric charge is restricted in a high-speed electrophotographic image forming process, it is preferable to accumulate a sufficient amount of electric charge in each domain in order to electrically discharge an enough amount of electric charge in one discharge.

The electro-conductive layer has a matrix and a plurality of domains dispersed in the matrix. The matrix contains a first rubber and the domains contain a second rubber and an electrically conductive agent. The matrix and domains satisfy constituent requirement (i) and constituent requirement (ii).

Constituent requirement (i): The volume resistivity of the matrix is greater than $1.0 \times 10^{12}$ Ω·cm.

Constituent requirement (ii): The domain volume resistivity is smaller than the volume resistivity of the matrix.

An electro-conductive member provided with an electro-conductive layer satisfying constituent requirements (i) and (ii) can accumulate sufficient electric charge in each domain when a bias is applied between the electro-conductive member and a photosensitive member. In addition, since the domains are separated from each other by a matrix with a high volume resistivity, the simultaneous transferring and receiving of electric charges between domains can be suppressed. Due to this, the majority of the electric charge accumulated in the electro-conductive layer can be prevented from being released in one discharge.

As a result, even immediately after one discharge is completed, the electro-conductive layer can be set to a state in which the electric charge for the next discharge is still accumulated. Therefore, a discharge can be stably generated in a short cycle. The discharge achieved by the electro-conductive member according to the present disclosure is also referred to below as "fine discharge".

As described above, an electro-conductive layer provided with a matrix-domain structure satisfying constituent requirements (i) and (ii) can suppress the generation of simultaneous electric charge transferring and receiving between domains when bias is applied and can accumulate sufficient electric charges in the domains. Therefore, the electro-conductive member can continuously impart a stable electric charge to the object for charging even in a case of being applied to an electrophotographic image forming apparatus with a high process speed.

The two effects described above of expanding the discharge width and fine discharge at the nip vicinity side enable the suppression of the ghost image described above even in a process configured for high-speed by equalizing the surface potential unevenness before entering the charging process by carrying out the discharge in a dense and stable manner during charging.

Electro-Conductive Member

Figure 2:
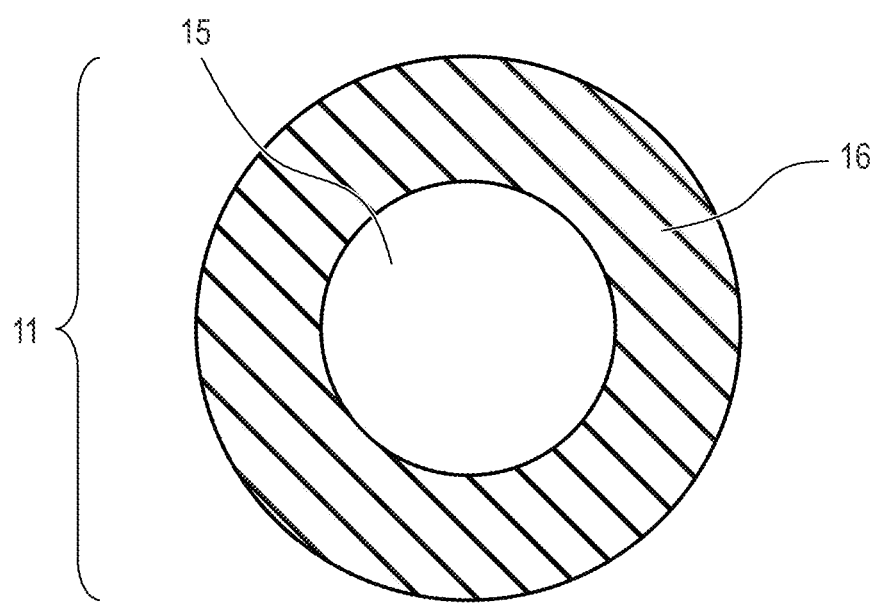
FIG. 2 is a schematic diagram of a rubber composition with a matrix-domain structure.

FIG. 2 is a cross-sectional view orthogonal with respect to the longitudinal direction of the electro-conductive roller 11 according to one aspect of the present disclosure. The electro-conductive roller 11 has a columnar or hollow cylindrical electro-conductive support 15 and an electro-conductive layer 16 formed on the outer circumferential surface of the support.

Figure 3A:
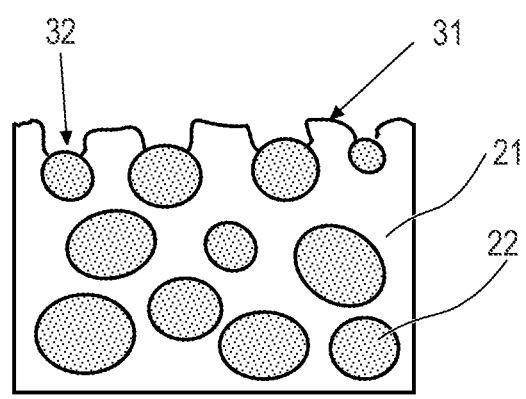
FIG. 3A is a schematic diagram of a matrix-domain structure of an outer surface of an electro-conductive member.
Figure 3B:
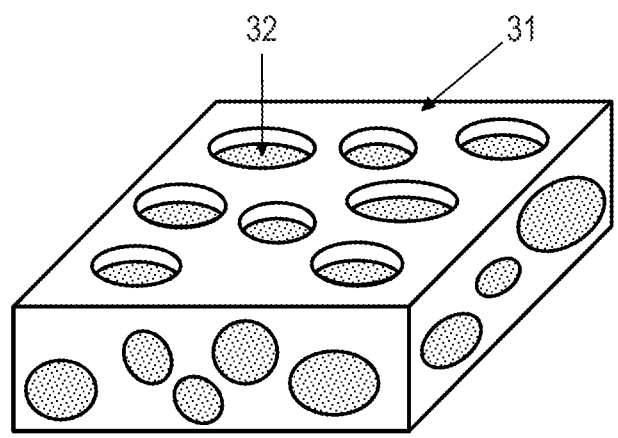
FIG. 3B is a schematic diagram of the matrix-domain structure of the outer surface of the electro-conductive member.

FIG. 3A illustrates a cross-sectional view of the electro-conductive layer in the direction orthogonal with respect to the longitudinal direction of the electro-conductive roller and FIG. 3B illustrates a perspective view of the electro-conductive layer surface side. The electro-conductive layer has a structure (also referred to below as "matrix-domain structure") having a matrix 21 and domains 22. The domains 22 include electro-conductive particles.

Electro-Conductive Support

The electro-conductive support can be appropriately selected and used from supports known in the field of electrophotographic electro-conductive members. Examples include aluminum, stainless steel, synthetic resins having conductivity, and metals or alloys such as iron and copper alloys. Furthermore, the above may be subjected to an oxidization process or plated with chromium, nickel, or the like. Both electroplating and electroless plating can be used as the plating method, but electroless plating is preferable from the viewpoint of dimensional stability. Examples of the types of electroless plating used here include nickel plating, copper plating, gold plating, and various other alloy platings. The plating thickness is preferably 0.05 µm or more and, considering the balance between operation efficiency and rust prevention capability, the plating thickness is preferably 0.1 µm to 30 µm. Examples of the shape of the electro-conductive support include columnar or hollow cylindrical. The outer diameter of the electro-conductive support is preferably in a range of φ3 mm to φ10 mm.

Electro-Conductive Layer

Matrix

The matrix includes the first rubber cross-linked product and a volume resistivity ρm of the matrix is preferably greater than $1.0\times10^{12}$ Ωcm and $1.0\times10^{17}$ Ωcm or less. By making the volume resistivity of the matrix greater than $1.0\times10^{12}$ Ωcm, as described above, the electric charge being transferred in the electro-conductive layer is transferred to the surface of the electro-conductive member while the transferring and stopping are repeated. Accordingly, even when a bias is applied, the simultaneous transferring and receiving of electric charges between domains can be prevented, thus, the discharge can be performed in a dense and stable manner.

In addition, by setting the volume resistivity ρm to $1.0\times10^{17}$ Ωcm or less, the discharge from the electro-conductive member to a member for charging can be smoothly performed when a charging bias is applied between the electro-conductive support and the member for charging.

The method for measuring the volume resistivity of the matrix is described below.

First Rubber

The first rubber has the highest blending ratio in the rubber composition for forming an electro-conductive layer. Since the cross-linked product of the rubber governs the mechanical strength of the electro-conductive layer, for the first rubber, a rubber is used, which, after cross-linking, exhibits the strength demanded for electrophotographic electro-conductive members, in the electro-conductive layer. In addition, considering that the volume resistivity of the matrix is greater than $1.0\times10^{12}$ Ωcm as described above, the following are preferable as the first rubber.

Natural rubber (NR), isoprene rubber (IR), butadiene rubber (BR), styrene-butadiene rubber (SBR), butyl rubber (IIR), ethylene-propylene rubber (EPM), ethylene-propylene-diene ternary copolymerized rubber (EPDM), chloroprene rubber (CR), and silicone rubber.

Reinforcing Agent

Reinforcing agents can be contained in the matrix to the extent that the conductivity of the matrix is not affected. Examples of reinforcing agents include reinforcing carbon black with low conductivity. Specific examples of reinforcing carbon blacks include FEF, GPF, SRF, and MT carbon.

Furthermore, fillers, processing aids, vulcanization aids, vulcanization accelerators, vulcanization accelerator aids, vulcanization retardants, anti-aging agents, softening agents, dispersants, colorants, and the like, which are generally used as blending agents for rubber, may be added to the first rubber forming the matrix as necessary.

Domains

The domains include the second rubber cross-linked product and the electro-conductive particles. Here, electro-conductive is defined as having a volume resistivity of less than $1.0\times10^{8}$ Ωcm.

Second Rubber

Specific examples of rubbers which can be used as the second rubber include the following.

NR, IR, BR, SBR, IIR, EPM, EPDM, CR, NBR, H-NBR, silicone rubber, and urethane rubber (U).

Electro-Conductive Particles

Examples of electro-conductive particles include carbon materials such as electro-conductive carbon black and graphite; electro-conductive oxides such as titanium oxide and tin oxide; metals such as Cu and Ag; and electrically conductive agents such as particles with electro-conductive oxides or metals coated on the surface and imparted with conductivity. Two or more types of these electro-conductive particles may be blended in appropriate amounts and used. It is preferable to use electro-conductive carbon black as the electro-conductive particles. Specific examples of electro-conductive carbon black include gas furnace black, oil furnace black, thermal black, lamp black, acetylene black, and Ketjen black.

Domain Diameter

The arithmetic mean value of the circular equivalent diameter of the domains (also referred to below simply as "domain diameter") is preferably 0.10 µm or more to 5.00 µm or less.

By setting the average value of the domain diameter to 0.10 µm or more, the path of electric charge transfer can be more effectively limited in the electro-conductive layer. The above value is more preferably 0.15 µm or more and even more preferably 0.20 µm or more.

In addition, by setting the average value of the domain diameter to 5.00 µm or less, the ratio of the surface area with respect to the total volume of the domain, that is, the specific surface area can be exponentially increased and the release efficiency of the electric charge from the domain can be dramatically improved. The average value of the domain diameter is preferably 2.00 µm or less and more preferably 1.00 µm or less, for the reasons described above. The method for calculating the domain diameter will be described below.

Distance Between Adjacent Domains (Also Referred to Below as "Inter-Domain Distance")

The arithmetic mean value of the inter-domain distance is preferably 0.2 µm or more to 4.0 µm or less. In order for the electro-conductive layer, in which domains are dispersed in the matrix, to carry sufficient electric charge to the outer surface of the electro-conductive member and carry out the discharge, the inter-domain distance is preferably 4.0 µm or less and particularly preferably 3.0 µm or less. On the other hand, in order to accumulate sufficient electric charge in the domains by ensuring that the domains are reliably separated from each other by the matrix, which is an insulating region, the inter-domain distance is preferably set to 0.2 µm or more and particularly preferably 0.3 µm or more. The method for calculating the inter-domain distance will be described below.

Method for Manufacturing Electro-Conductive Member

The electro-conductive member provided with the electro-conductive layer according to the present aspect can be formed, for example, through a method including the steps (A) to (D) described below.

Step (A): a step of preparing a rubber composition for forming domains (also referred to below as "CMB") including carbon black and a second rubber.

Step (B): a step of preparing a rubber composition for forming a matrix (also referred to below as "MRC") including a first rubber.

Step (C): a step of preparing a rubber composition having a matrix-domain structure by kneading the CMB and the MRC.

Step (D): a step of extruding the rubber composition having a matrix-domain structure together with an electro-conductive support (core metal) from a crosshead to coat the periphery of the core metal with the rubber composition having a matrix-domain structure.

Figure 5:
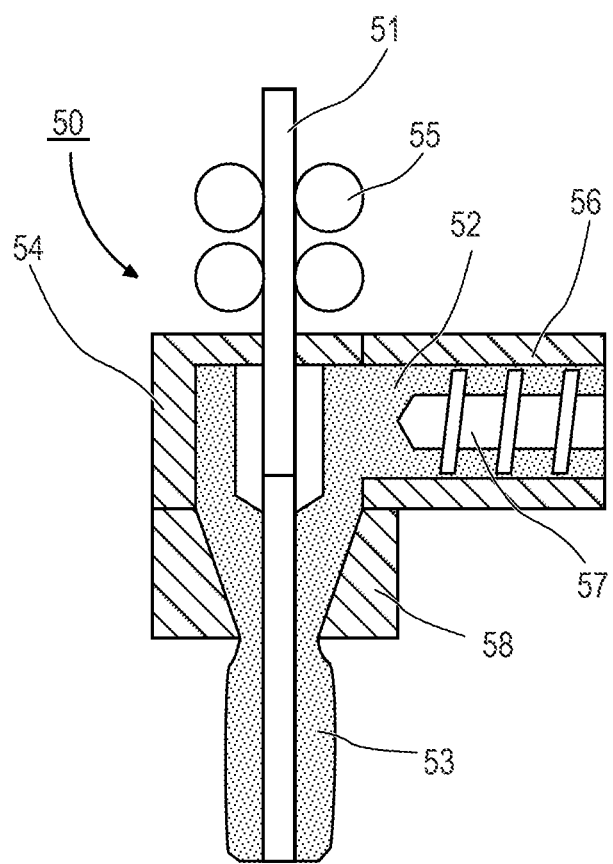
FIG. 5 is a diagram illustrating a schematic configuration of a crosshead extruder.

FIG. 5 is a schematic configuration diagram of a crosshead extrusion forming machine 50. The crosshead extrusion forming machine 50 is an apparatus for manufacturing an unvulcanized rubber roller 53 with a core metal 51 in the center by evenly coating an unvulcanized rubber composition 52 over the entire circumference of the core metal 51.

The crosshead extrusion forming machine 50 is provided with a crosshead 54 into which the core metal 51 and the unvulcanized rubber composition 52 are fed, transport rollers 55 which feed the core metal 51 into the crosshead 54, and a cylinder 56 which feeds the unvulcanized rubber composition 52 into the crosshead 54.

The transport rollers 55 continuously feed a plurality of core metals 51 in the axial direction to the crosshead 54. The cylinder 56 is provided with a screw 57 in an inner portion thereof and the rotation of the screw 57 feeds the unvulcanized rubber composition 52 into the crosshead 54.

When the core metal 51 is fed into the crosshead 54, the entire circumference is covered by the unvulcanized rubber composition 52 fed from the cylinder 56 into the crosshead. The core metal 51 is then fed out from a die 58 at the outlet of the crosshead 54 as the unvulcanized rubber roller 53 for which the surface is coated with the unvulcanized rubber composition 52.

Here, when the die swell value of the CMB prepared in step (A) is denoted by DS(d) and the die swell value of MRC prepared in step (B) is denoted by DS(m), DS(m)/DS(d) is greater than 1.00. Due to this, the electro-conductive member according to the present aspect can be formed.

The die swell value will be described below. When a rubber composition is extruded using a die extruder, the rubber composition, which was compressed due to the applied pressure inside the extruder, is released from the pressure by being extruded from the extrusion port and the extruded rubber composition expands and the thickness of the rubber composition becomes thicker than the size of the gap at the extrusion port of the die. The die swell value is an indicator representing the degree of expansion of the rubber composition when being extruded from the extrusion port.

In the method for manufacturing the charging member according to the present aspect, the CMB for forming domains and the MRC for forming a matrix, which satisfy the relationship DS(m)/DS(d)>1.00, are mixed to prepare a rubber composition having a matrix-domain structure. Next, the rubber composition having a matrix-domain structure is extruded from the extrusion port of the crosshead. Then, since the expansion rate of the matrix is greater than the expansion rate of the domains, the matrix at the periphery of the domains present on the surface of the extruded rubber composition is raised and, as a result, a layer of an unvulcanized rubber composition is formed to have concave portions on the surface and with domains present at the bottom portions of the concave portions. The DS(m)/DS(d) described above is preferably 1.15 or more in order to more easily form the configuration of the electro-conductive layer according to the present aspect. By setting the above to 1.15 or more, concave portions with exposed domains can be formed more effectively.

The die swell values of the CMB for forming domains and the MRC for forming a matrix can be adjusted, for example, according to the filler type and amount to be added. Specifically, increasing the added amount of filler decreases the die swell value. In addition, in a case where fillers with high reinforcing effect on rubber such as carbon black and silica, or scale-like fillers such as bentonite and graphite are used as fillers, the die swell value will be smaller in comparison with a case of using calcium carbonate. The electro-conductive particles added to the CMB are also considered to be such a filler.

Examples of methods for kneading CMB, which becomes the domains, and MRC, which becomes the matrix, to make an unvulcanized rubber composition having a matrix-domain structure in step (C) include the methods described in (i) and (ii) below.

(i) A method in which CMB, which becomes the domains, and MRC, which becomes the matrix, are each mixed using a closed-type mixer such as a Banbury mixer or a pressurized kneader, then, an open-type mixer such as an open roll is used to knead CMB, which becomes the domains, and MRC, which becomes the matrix, and raw materials such as vulcanization agents and vulcanization accelerators into a single unit.

(ii) A method in which CMB, which becomes the domains, is mixed using a closed mixer such as a Banbury mixer or a pressurized kneader, then the raw materials of CMB, which becomes the domains, and MRC, which becomes the matrix, are mixed in a closed mixer, and then the raw materials such as vulcanization agents and vulcanization accelerators are kneaded together into a single unit using an open mixer such as an open roll.

The unvulcanized rubber roller formed by step (D) can undergo a vulcanization step as step (E) to obtain the electro-conductive member according to the present aspect. Specific examples of the heating method include hot air furnace heating using a gear oven, heat vulcanization using far infrared rays, steam heating using a vulcanizer, and the like. Among the above, hot air furnace heating and far infrared heating are preferable due to being suitable for continuous production.

In order to better maintain the surface shape of which the domains are present at the bottom portions of the concave portions, as formed by the method described above, it is preferable not to perform polishing on the surface of the obtained electro-conductive member (electro-conductive roller). Accordingly, in a case where the external shape of the electro-conductive layer of the electro-conductive member according to the present aspect is to be crown-shaped, it is preferable to form the outer diameter shape of the unvulcanized rubber layer into a crown shape by controlling the extrusion rate of the core metal from the crosshead and the extrusion rate of the unvulcanized rubber composition. A crown shape refers to a shape in which the outer diameter of the central portion of the electro-conductive layer in the longitudinal direction of the core metal is larger than the outer diameter of the end portions.

Specifically, in the extruder 50 illustrated in FIG. 5, the relative ratio of the core metal feed rate of the core metal 51 by the transport rollers 55 and the unvulcanized rubber composition feed rate from the cylinder 56 is varied. At this time, the feed rate of the unvulcanized rubber composition 52 from the cylinder 56 to the crosshead 54 is set to be constant. The ratio of the feed rate of the core metal 51 to the feed rate of the unvulcanized rubber composition 52 determines the wall thickness of the unvulcanized rubber composition 52. Due to this, the electro-conductive layer can be crown-shaped without performing polishing.

The vulcanized rubber composition at both end portions of the vulcanized rubber roller is removed in a subsequent separate step to complete the vulcanized rubber roller. Accordingly, the completed vulcanized rubber roller has both end portions of the core metal exposed.

The electro-conductive layer on the surface may be subjected to a surface treatment by being irradiated with ultraviolet light or electron beams.

Matrix-Domain Structure

The electro-conductive member formed through the method including the above steps (A) to (D) has a matrix-domain structure. A method for observing the matrix-domain structure will be described below, but it is preferable that, in a cube with sides of 10 μm, the number of domains dispersed in the matrix is 500 or less. This is because in a case where the number of domains is higher than 500, the distance between domains is reduced, the electric charge accumulation at the interface between the domains and the matrix easily becomes insufficient, and the denseness of the discharge may be impaired.

Figure 12:
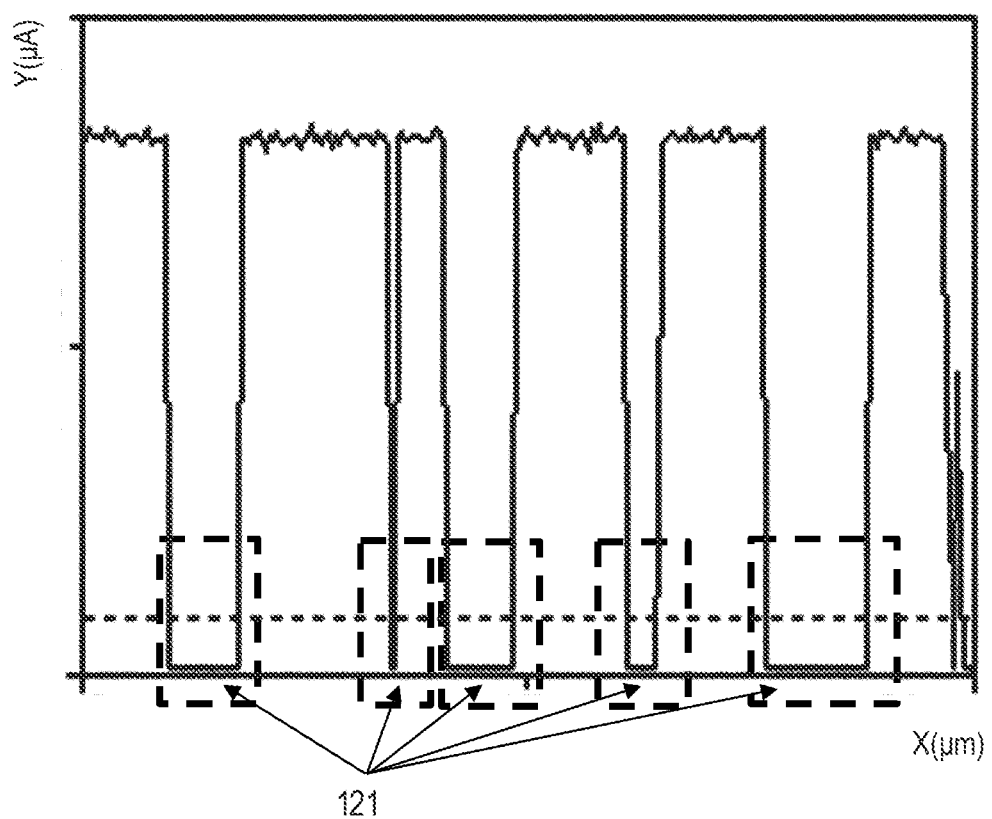
FIG. 12 is a diagram illustrating an example of current profile measurement results using an AFM.

In the matrix-domain structure of the outer surface, the domains 22 are exposed in concave portions 32 as illustrated in FIGS. 3A and 3B. In terms of effectively expanding the discharge width to the nip vicinity side at the upstream portion of the nip as described above, it is preferable that the ratio of the domains exposed on the outer surface at the bottom portions of the concave portions 32 among the domains 22 (referred to below as the "domain exposure rate in the concave portions") is 50% or more. In addition, the depth of the domains exposed in the concave portions from the outer surface of the matrix (referred to below as "domain depth") is preferably 2 μm or more. In the present aspect, the definition of domains being exposed on the outer surface is being a location where the current value is one or more digit smaller than the average current value of the matrix portion, as illustrated in 121 in FIG. 12 in the current value measurement by an AFM described below. Additionally, the definition of an exposed domain being concave is being a height of 1.0 μm or more lower than the average height of the matrix in the height measurement by an AFM described below.

In order for the fine discharge described above to occur, it is necessary to carry out discharge only from the domains. In the present disclosure, when a current value when a DC voltage of 80 V is applied between the electro-conductive support and a cantilever of an atomic force microscope in contact with a surface of the matrix which forms the surface of the electro-conductive member is denoted by A1 and a current value when a DC voltage of 80 V is applied between the electro-conductive support and the cantilever of an atomic force microscope in contact with the surface of the domain which forms the surface of the electro-conductive member is denoted by A2, A2 is at least 20 times A1.

Electrophotographic Image Forming Apparatus

The charging member according to one aspect of the present disclosure can be used in an electrophotographic image forming apparatus, such as a laser printer, as well as in a process cartridge which is attachable to and detachable from the electrophotographic image forming apparatus.

Figure 6:
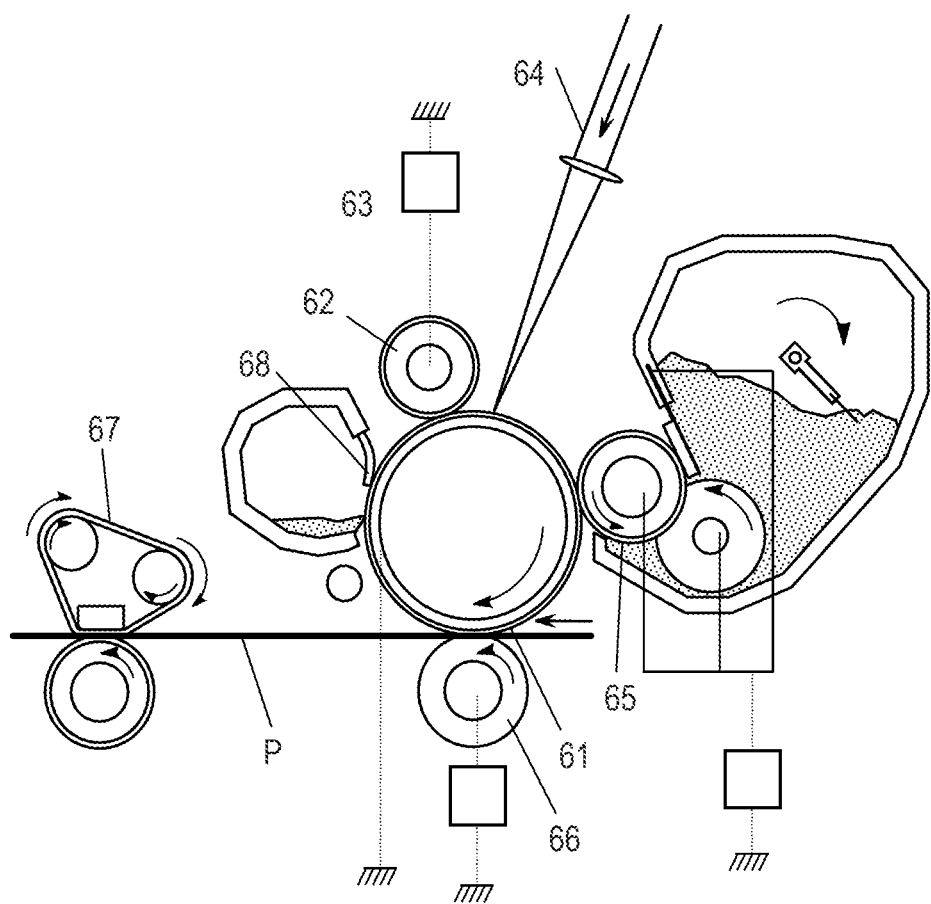
FIG. 6 is a diagram illustrating a configuration of an electrophotographic image forming apparatus.

FIG. 6 illustrates a schematic cross-sectional view of an electrophotographic image forming apparatus according to one aspect of the present disclosure. An electrophotographic photosensitive member (referred to below as the "photosensitive member") 61 as an object for charging is formed of an electro-conductive support and a photosensitive layer formed on the electro-conductive support and has a cylindrical shape. Driving is carried out at a predetermined circumferential speed clockwise in the drawing and centering on the axis.

The charging roller 62 is arranged in contact with the photosensitive member 61 and charges the photosensitive member 61 to a predetermined potential. The charging roller 62 is formed of a core metal and an electro-conductive layer formed on the core metal, in which both end portions of the core metal are pressed against the photosensitive member 61 by a pressing unit (not illustrated), and was driven to rotate in accordance with the driving of the photosensitive member 61. The photosensitive member 61 is charged to a predetermined potential by applying a predetermined DC voltage to the core metal by a rubbing electrode with a power source 63.

Then, an electrostatic latent image corresponding to the desired image information is formed on the circumferential surface of the charged photosensitive member 61 by an exposure unit 64. The electrostatic latent image is then sequentially made to be visible as a toner image by a developing member 65. This toner image is transferred to a transfer material P in sequence. The transfer material P is transported from the paper feeding section to the transfer section between the photosensitive member 61 and a transfer unit 66 at an appropriate timing synchronized with the rotation of the photosensitive member 61. The transfer unit 66 is a transfer roller and the toner image on the photosensitive member 61 side is transferred to the transfer material by being charged with the opposite polarity of the toner from the back of the transfer material. The transfer material with the toner image transferred to the surface thereof is separated from the photosensitive member 61 and transported to a fixing unit 67 and the toner is fixed and output as a product with an image formed thereon. For the circumferential surface of the photosensitive member 61 after image transfer, a cleaning member 68 represented by an elastic blade is used to remove residual toner and the like from the surface of the photosensitive member 61. The circumferential surface of the cleaned photosensitive member 61 moves on to the next cycle of the electrophotographic image forming process.

Process Cartridge

Figure 7:
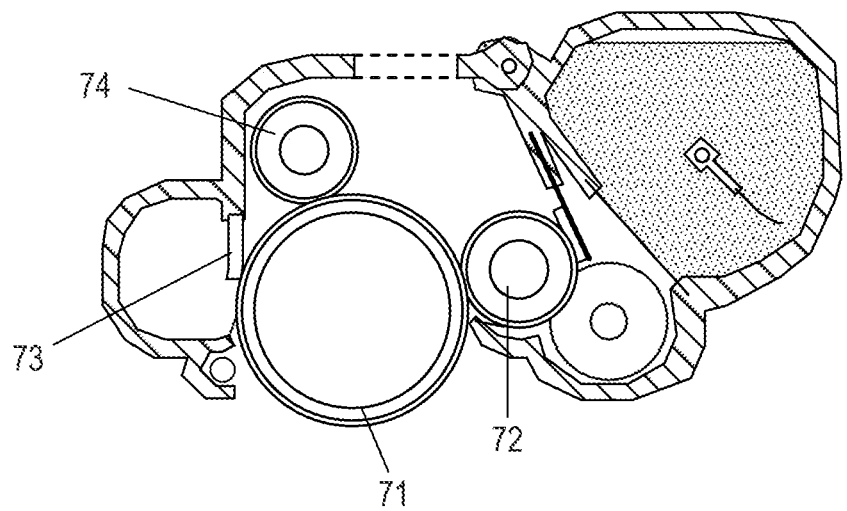
FIG. 7 is a diagram illustrating a configuration of a process cartridge.

A process cartridge according to an aspect of the present disclosure is illustrated in FIG. 7. The process cartridge is attachable to and detachable from an electrophotographic image forming apparatus. The process cartridge is provided with an electrophotographic photosensitive member 71, a charging roller 74 arranged to enable charging of the electrophotographic photosensitive member 71, a developing roller 72, and a cleaning member 73. As the charging roller 74, the charging member according to one aspect of the present disclosure is used.

EXAMPLES

Example 1

1-1. Preparation of Rubber Mixture for Forming Domains (CMB)

CMB 1 was prepared by mixing the carbon master batch (CMB) raw materials listed in Table 1 below in the blending amounts illustrated in Table 1. A 6-liter pressurized kneader (product name: TD6-15MDX, manufactured by Toshinsha Co., Ltd.) was used as the mixer. The mixing conditions were set to a filling ratio of 70 vol %, a blade rotation speed of 30 rpm, and 16 minutes.

TABLE 1

| | Material | Blending amount (parts by mass) |
|---|---|---|
| Second rubber | Acrylonitrile butadiene rubber (NBR) (Product name: N230SL, manufactured by JSR Corporation) | 100 |
| Electro-Conductive particles | Carbon black (Product name: TOKABLACK #7360SB, manufactured by Tokai Carbon Co., Ltd.) | 60 |
| Vulcanization accelerator aid | Zinc oxide (Product name: Zinc oxide grade two, manufactured by Sakai Chemical Industry Co., Ltd.) | 5 |
| Processing aid | Zinc stearate (Product name: SZ-2000, manufactured by Sakai Chemical Industry Co., Ltd.) | 1 |

1-2. Calculation of Die Swell of CMB

The die swell value (DS(d)) of CMB 1 prepared as described above was calculated by the following method.

That is, the die swell measurement is performed using a capillary rheometer (product name: Capilograph 1D type, manufactured by Toyo Seiki Co., Ltd.) according to JIS K 7199: 1999.

The measurement was carried out with a capillary length of 10 mm, a capillary diameter D of 2 mm, a furnace diameter of 9.55 mm, a load cell type of 20 kN, and a measurement temperature of 80° C. As the die swell, a diameter R [mm] of an extruded strand was measured at a piston speed of 100 mm/min (shear rate: $1.52 \times 10^2$) and calculated as the die swell DS=R/D.

1-3. Preparation of Rubber Mixture for Forming Matrix (MRC)

Each material was mixed in a pressurized kneader according to the types and amounts illustrated in Table 2 to obtain a rubber mixture for forming a matrix (MRC). The mixing conditions were a filling ratio of 70 vol %, a blade rotation speed of 30 rpm, and 16 minutes.

For the obtained mixture, the die swell value (DS(m)) of the mixture was calculated in the same manner as the method for calculating the die swell of the CMB.

TABLE 2

| | Material | Blending amount (parts by mass) |
|---|---|---|
| First rubber | Styrene butadiene rubber (SBR) (Product name: Tufdene 2003, manufactured by Asahi Kasei Corporation) | 100 |
| Filler | Calcium carbonate (Product name: Nanox #30, manufactured by Maruo Calcium Co., Ltd.) | 40 |
| Vulcanization accelerator aid | Zinc oxide (Product name: Zinc oxide grade two, manufactured by Sakai Chemical Industry Co., Ltd.) | 5 |
| Processing aid | Zinc stearate (Product name: SZ-2000, manufactured by Sakai Chemical Industry Co., Ltd.) | 2 |

1-4. Preparation of Electro-conductive Rubber Composition 1

A rubber composition for forming an electro-conductive member was prepared by mixing each material in an open roll according to the types and amounts illustrated in Table 3. As the mixer, an open roll with a roll diameter of 12 inches was used. The mixing conditions were a front roll rotation speed of 10 rpm, a rear roll rotation speed of 8 rpm, and a roll gap of 2 mm, and, after a total of 20 left and right turns were performed, 10 thin passes were performed with a roll gap of 0.5 mm.

TABLE 3

| | Material | Blending amount (parts by mass) |
|---|---|---|
| domain material | CMB 1 | 25 |
| Matrix material | MRC 1 | 75 |
| Vulcanization agent | Sulfur (Product name: SULFAX PMC, sulfur content 97.5%, manufactured by Tsurumi Chemical Industry Co., Ltd.) | 3 |
| Vulcanization accelerator 1 | Tetrabenzylthiuram disulfide (Product name: SANCELER TBzTD, manufactured by Sanshin Chemical Industry Co., Ltd.) | 1 |
| Vulcanization accelerator 2 | N-t-butyl-2-benzothiazolesulfenimide (Product name: SANTOCURE-TBSI, manufactured by FLEXSYS) | 0.5 |

1-5. Formation of Vulcanized Rubber Layer

First, the following operations were performed to obtain a core metal having an adhesive layer which adheres to the vulcanized rubber layer. That is, an electro-conductive vulcanizing adhesive (product name: Metaloc U-20; manufactured by Toyokagaku Kenkyusho Co., Ltd.) was coated on the central portion at 222 mm in the axial direction of a cylindrical electro-conductive core metal (made of steel, with a nickel-plated surface) with a diameter of 6 mm and a length of 252 mm and dried for 30 minutes at 80° C.

The core metal having the adhesive layer was coated with an electro-conductive rubber composition 1 prepared as described above using a crosshead extrusion forming machine to obtain a crown-shaped unvulcanized rubber roller. The forming temperature was set at 100° C. and the screw rotation speed at 10 rpm and forming was carried out while changing the feed rate of the core metal. The inner diameter of the die of the crosshead extrusion forming machine was 8.4 mm, the unvulcanized rubber roller was formed to become thicker, and the outer diameter of the center of the unvulcanized rubber roller in the axial direction was 8.6 mm and the outer diameter of the end portions was 8.5 mm. Thereafter, heating was carried out in an electric furnace at a temperature of 160° C. for 60 minutes to vulcanize the layer of the unvulcanized rubber composition 1 so as to form a vulcanized rubber layer. Both end portions of the vulcanized rubber layer were cut and the length in the axial direction was set to 232 mm to make a vulcanized rubber roller.

1-6. Ultraviolet Light Irradiation of Vulcanized Rubber Layer After Extrusion The surface of the obtained vulcanized rubber roller was irradiated with ultraviolet light to obtain an electro-conductive member (charging roller) 1 in which the surface of the electro-conductive layer (surface layer) was modified. As the light source for the ultraviolet light, a low-pressure mercury lamp (product name: GLQ500US/11, manufactured by Toshiba Lighting and Technology Corporation) was used. In addition, the ultraviolet light was irradiated uniformly while rotating the charging roller. The ultraviolet light amount was set to be 8,000 mJ/cm$^2$ in sensitivity at a sensor of 254 nm. The obtained electro-conductive member 1 was subjected to evaluations 1-7 to 1-15 described below.

1-7. Confirmation of Matrix-Domain Structure

The presence or absence of a matrix domain structure in the electro-conductive layer was confirmed by the following method.

Using a razor, pieces (500 µm thick) of the electro-conductive member were cut out such that the cross-section orthogonal to the longitudinal direction of the electro-conductive layer could be observed. A total of 20 pieces were cut out, one arbitrarily from each region obtained by dividing the electro-conductive layer of the electro-conductive member (electro-conductive roller) into five equal parts in the longitudinal direction and four equal parts in the circumferential direction. Next, for each of the pieces, platinum was deposited on the surface corresponding to the cross-section of the electro-conductive layer in the thickness direction. The platinum-deposited surface of the pieces was imaged using a scanning electron microscope (SEM) (product name: S-4800, manufactured by Hitachi High-Technologies Corporation) at a magnification of 1000 times and SEM images were obtained. In a case where the electro-conductive layer has a matrix domain structure, it can be confirmed that, in the SEM image, the plurality of domains were separated by the matrix and also that the matrix was in a connected state in the SEM image. For the electro-conductive member 1 according to Example 1 and electro-conductive members 2 to 19 according to Examples 2 to 19 described below, it was confirmed that the matrix domain structure was present in the electro-conductive layer.

1-8. Method for Measuring Volume Resistivity of Matrix

The volume resistivity of the matrix can be obtained, for example, by cutting out a flake of a predetermined thickness (for example, 1 µm), in which the matrix domain structure is included, from the electro-conductive layer and measuring the volume resistivity in the matrix in the flake by bringing a micro probe of a scanning probe microscope (SPM) or an atomic force microscope (AFM) into contact therewith. Specifically, in a case where the longitudinal direction of the electro-conductive member is the X axis, the thickness direction of the electro-conductive layer is the Z axis, and the circumferential direction is the Y axis, a flake is cut out from the elastic layer to include at least a part of the surface parallel to the YZ plane, which is orthogonal to the axial direction of the electro-conductive member. The cutting out can be performed using, for example, a sharp razor, a microtome, or a Focused Ion Beam method (FIB). To measure the volume resistivity, one surface of the flake cut out from the electro-conductive layer is grounded. Next, the electrical resistance value is calculated by bringing a micro probe of a scanning probe microscope (SPM) or an atomic force microscope (AFM) into contact with the portion of the matrix on the surface of the opposite side to the ground surface of the flake, applying a DC voltage of 50 V thereto for 5 seconds, calculating the arithmetic mean value from the value of the measured ground current value for 5 seconds, and dividing the applied voltage by the calculated value. Finally, the resistance value is converted into the volume resistivity using the film thickness of the flake. At this time, the SPM or AFM can also measure the film thickness of the flake at the same time as the resistance value.

The value of a volume resistivity of the matrix R1 in a cylindrical charging member is determined, for example, by cutting out one flake sample each from each region when the electro-conductive layer is divided into four sections in the circumferential direction and five sections in the longitudinal direction and then calculating the arithmetic mean value of the volume resistivities of a total of 20 samples after obtaining the measurement values described above.

In the present Example, first, flakes with a thickness of 1 µm were cut out from the electro-conductive layer of the electro-conductive member using a microtome (product name: Leica EM FCS, manufactured by Leica Microsystems) at a cutting temperature of −100° C. The flakes were cut out such that at least a part of the surface parallel to the YZ plane orthogonal to the axial direction (X axis) of the electro-conductive member was included, as described above. In an environment with a temperature of 23° C. and a humidity of 50% RH, one surface of the flake (also referred to below as the "ground surface") was grounded on a metal plate and the cantilever of a scanning probe microscope (SPM) (product name: Q-Scope 250, manufactured by Quesant Instrument Corporation) was brought into contact with a location corresponding to the matrix of the surface (also referred to below as the "measurement surface") on the opposite side to the ground surface of the flake and where there were no domains present between the measurement surface and the ground surface. Subsequently, a voltage of 50 V was applied to the cantilever for 5 seconds, the current value was measured, and the arithmetic mean value for 5 seconds was calculated.

The surface shape of the measured piece was observed with the SPM and the thickness of the measurement point was calculated from the obtained height profile. Furthermore, the concave portion area of the contact portion of the cantilever was calculated from the surface shape observation results. The volume resistivity was calculated from the thickness and the concave portion area.

Regarding the flakes, the electro-conductive layer was divided into five equal parts in the longitudinal direction and four equal parts in the circumferential direction and one section was arbitrarily produced from each of these regions, for a total of 20 pieces, and the measurement described above was performed. The average value thereof was used as the volume resistivity of the matrix.

The scanning probe microscope (SPM) (product name: Q-Scope 250, manufactured by Quesant Instrument Corporation) was operated in contact mode.

1-9. Calculation of Electro-conductive Member Volume Resistivity

The electro-conductive layer of the charging roller was cut out with a razor to obtain a piece of rubber with a semi-cylindrical shape. The volume resistivity of the cut surface of the rubber was measured using the four-terminal, four-point probe method. As the measurement conditions, in a resistivity meter (product name: Loresta GP, manufactured by Mitsubishi Chemical Analytech Co., Ltd.) and in an environment of 23° C./50% RH (relative humidity), the applied voltage was 90 V, the load was 10 N, the distance between pins was 1.0 mm, the pin tip was 0.04 R, and the spring pressure was 250 g. The evaluation results of the volume resistivity are illustrated in Table 7-2.

1-10. Measurement of Domain Exposure Rate, Depth of Concave Portion, and Current Value in Concave Portion by AFM For the surface shape of the charging member, the confirmation of the presence of domains at the bottom portions of the concave portions, and the current values of the domains and the matrix, measurement values were adopted which were measured using an atomic force microscope (AFM) (Easy Scan 2, Nanosurf AG) in the spreading resistance mode.

Figure 8:
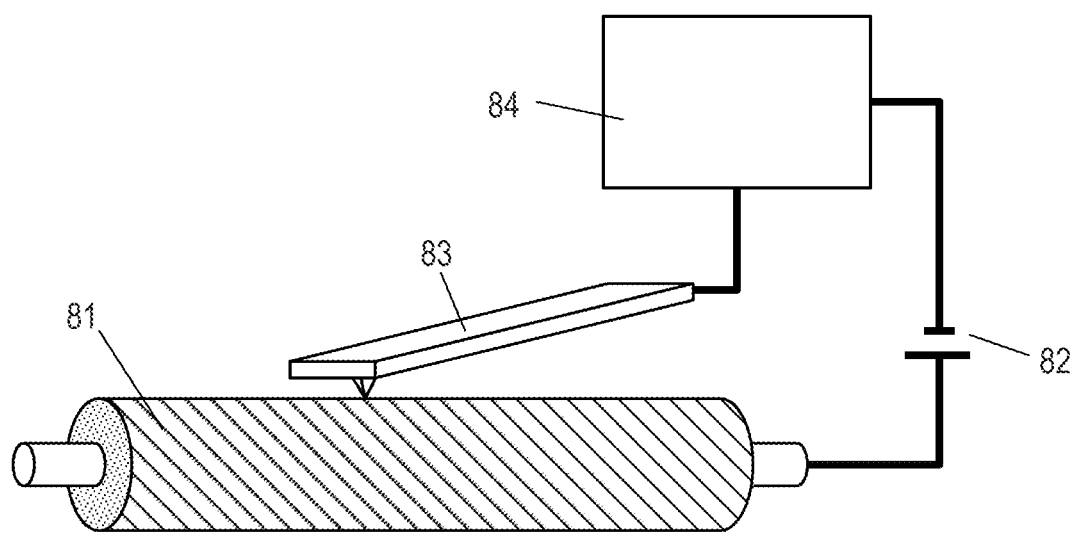
FIG. 8 is a diagram illustrating a schematic configuration of an apparatus for measuring the current of a charging roller using an AFM.

FIG. 8 illustrates a configuration diagram of the conductivity measurement apparatus. A DC power source (PL-650-0.1, Matsusada Precision Inc.) 82 is connected to the electro-conductive substrate of a charging roller 81 to apply 80 V thereto and the free end of a cantilever 83 is brought into contact with the electro-conductive layer, and a current image is obtained through an AFM main body 84.

In the present Examples, the measurement conditions were set to be cantilever: ANSCM-PC, operation mode: spreading resistance, measurement environment: in air, set point: 20 nN, P-gain: 3000, I-gain: 600, D-gain: 0, tip voltage: 3 V, image width: 100 μm, and number of lines: 256. The shape image and the current image were acquired simultaneously during this AFM measurement. In the current image line profile illustrated in FIG. 12, the regions where the current value was one or more digit smaller than the average value (121 in FIG. 12) were extracted as domains.

Figure 9:
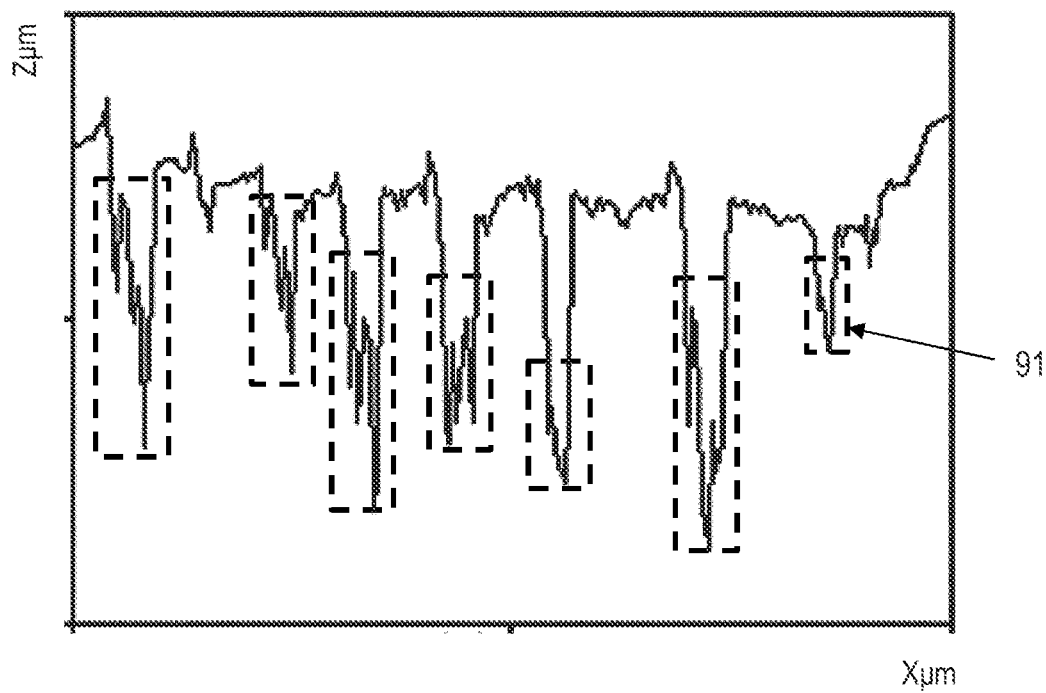
FIG. 9 is a diagram illustrating an example of measurement results of the depth of concave portions using an AFM.

The number of extracted domains was counted to determine the total number of domains exposed on the outer surface. Thereafter, from the line profile of the AFM shape image illustrated in FIG. 9, the number of domains where the exposed domains were concave to the outer surface was counted. As described above, in a case where the average value of the domain in the height direction Z is 1.0 μm or more lower than the average value outside the domains in the height direction Z, the exposed domain is defined as concave. The value obtained by dividing the number of domains which are concave with respect to the outer surface by the total number of domains on the outer surface as described above was set as the domain exposure rate in the concave portions. The results are illustrated in Table 7.

In addition, the depth of the concave portion was set by subtracting the average value of the above domain portions in the height direction Z from the average value outside the domains in the height direction Z. The depths of the concave portions are illustrated in Table 7.

Additionally, the average value of the current values of the domains extracted when calculating the depth of the concave portions was set as A2. On the other hand, the portions other than the domain portions were set as the matrix and the average value of the current value thereof was set as A1. The larger A2/A1 is, the lower the electrical resistance of the domains in comparison with the matrix. The results of A2/A1 are illustrated in Table 7-2.

1-11. Domain Diameter D

For the measurement of a domain diameter D according to the present disclosure, a cross-sectional area S of the domains was calculated for the domains present in a 15 μm square region by using the counting function with respect to a binarized image obtained in the measurement for the confirmation of the matrix-domain structure in [1-7] described above.

From the area S of the domain, the circular equivalent diameter was calculated. Specifically, $D=(4S/\pi)^{0.5}$ was calculated using the area S of the domain.

For the measurement of the domain diameter D, the electro-conductive layer of the electro-conductive member was divided into four sections in the circumferential direction and five sections in the longitudinal direction. At any arbitrary location in each of those regions, one flake sample each was cut out and measurement was performed in the same manner as the method for measuring the shape of the domains described above. Measurements were performed in a total of 16 regions, divided into 4 sections in the longitudinal direction and 4 sections in the circumferential direction, and the average value thereof was calculated and set as the domain diameter D. The results are illustrated in Table 7-2.

1-12. Inter-Domain Distance

The measurement of the inter-domain distance was obtained by image processing an observed image obtained by observing the image obtained in the measurement of the domain diameter.

Specifically, the arithmetic mean value was calculated from the distribution of the distance between the wall surfaces of the domains using image-processing software (product name: LUZEX, manufactured by Nireco) with respect to the method for measuring the size of domains described above. Measurement was performed in a total of 16 regions, divided into 4 sections in the longitudinal direction and 4 sections in the circumferential direction, and the average value thereof was calculated to be the inter-domain distance. The evaluation results are illustrated in Table 7-2.

1-13. Measurement of Discharge Width at Nip Upstream Portion

The discharge width was measured by directly observing a discharge light inside a blackout curtain as follows.

Figure 10:
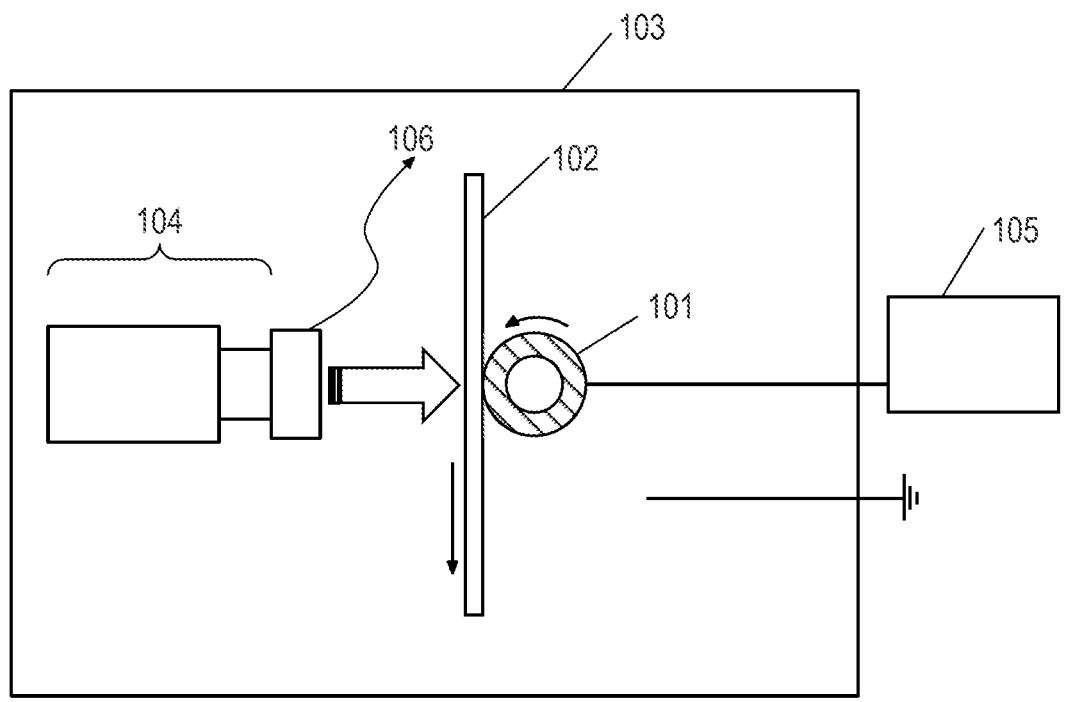
FIG. 10 is a diagram illustrating a schematic configuration of a discharge light observation apparatus.

First, as illustrated in FIG. 10, a photosensitive drum-simulating glass 102 (width 250 mm, length 300 mm, thickness 5 mm) which simulated a photosensitive drum was prepared. A jig was produced such that a charging roller 101 could come into contact with the jig and the charging roller 101 was driven by moving the photosensitive drum-simulating glass 102 in the contact state to reproduce the rotation in a process cartridge.

Since the outer diameter of the photosensitive drum is as large as 20 to 30 mm while the discharge width and the discharge start distance are generally several hundred μm, measurement using a flat photosensitive drum-simulating glass as described above can be adopted instead.

The photosensitive drum-simulating glass was provided with a transparent electro-conductive film and a transparent resin film such that a discharge could be generated by applying a voltage between the photosensitive drum-simulating glass and the charging roller. For the transparent electro-conductive film, ITO (indium tin oxide) was coated on the glass by a method such as sputtering, only on the surface which came into contact with the charging roller. The electrical resistance value of the transparent electro-conductive film was 200 Ω when the surface was measured with a two-terminal tester. Next, polyethylene terephthalate, which has equal volume resistivity to the surface layer of the photosensitive drum, was dissolved in an organic solvent such as chlorobenzene and a transparent resin film was formed on the transparent electro-conductive film by dipping and hot air drying. The film thickness of the transparent resin film was 20 μm. First, the center of the contact portion with the glass was observed in a bright light environment using a high-speed camera (FASTCAM SA5, manufactured by Photron Limited) 104 and an image intensifier (C9547-2, manufactured by Hamamatsu Photonics K.K.) 106. For observation, the angle of view of the high-speed camera was set to 1024 pixels×1024 pixels, the frame rate was set to 500 fps, and the gain of the image intensifier was set to 800. At that time, the contact region in the observed image became a band shape as in FIG. 11B and the load for pressing the charging roller against the photosensitive drum-simulating glass was adjusted such that the contact width Y was 500 μm. The contact width was calculated by measuring the corresponding number of pixels and carrying out conversion from the observation magnification. Thereafter, the measurement of the discharge width was carried out in a state where the apparatus was surrounded by a blackout curtain 103. Using the high-speed camera (FASTCAM SA5 manufactured by Photron Limited) 104 and the image intensifier 106, the discharge light generated in the gap with the charging roller 101 was observed through the photosensitive drum-simulating glass 102. During the observation, the angle of view of the high-speed camera was set to 1024 pixels×1024 pixels, the frame rate was set to 500 to 4000 fps, and the gain of the image intensifier was set to 700 to 900.

Figure 11A:
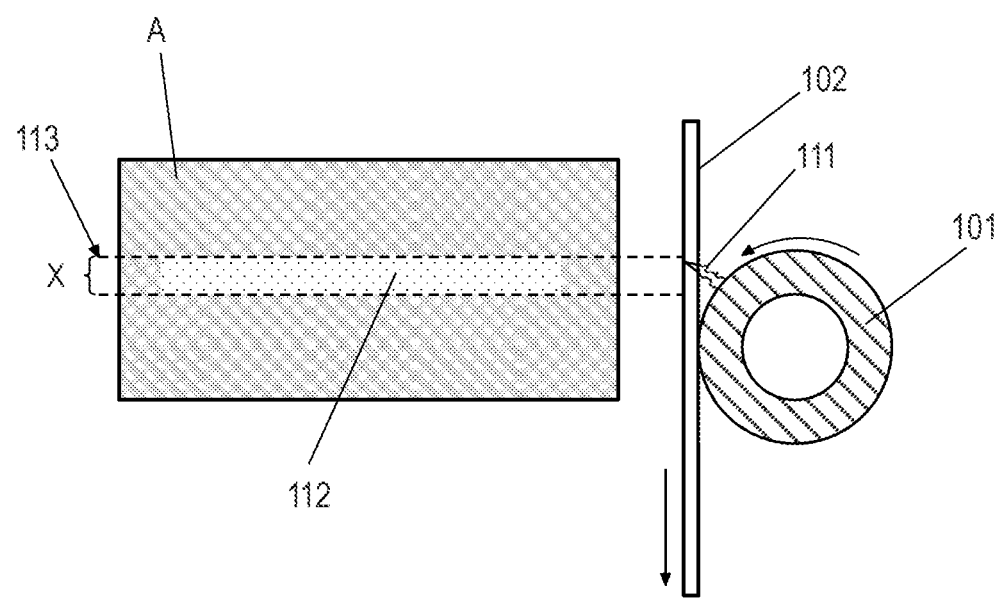
FIG. 11A is a schematic diagram illustrating a discharge light image and a contact region.
Figure 11B:
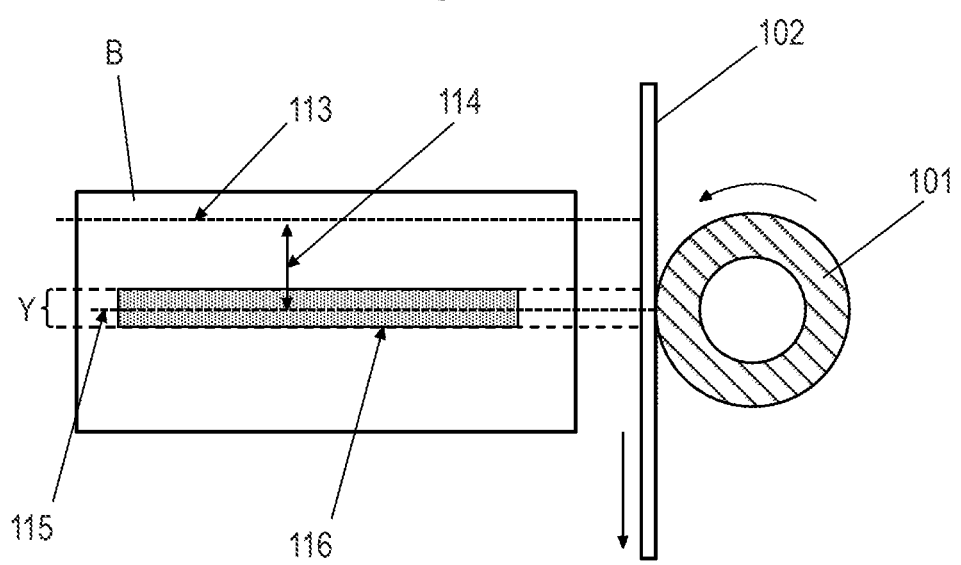
FIG. 11B is a schematic diagram illustrating the discharge light image and the contact region.

The photosensitive drum-simulating glass was grounded and a DC voltage of −1300 V was applied to the charging roller 101 using a high-voltage power source (Trek 615-3, manufactured by Trek Japan) 105 connected to the charging roller. After the DC voltage was applied, imaging was started one second after the photosensitive drum-simulating glass 102 started moving at a speed of 200 mm/sec and the imaging was carried out for two seconds. The discharge generated in the gap with the charging roller 101 inside the blackout curtain 103 was observed. The image of the observed discharge light was illustrated as A in FIG. 11A. Since the image is observed through the photosensitive drum-simulating glass 102, a discharge 111 can be captured as a band-shaped image 112. FIG. 11B illustrates the discharge region, the contact region 116 between the photosensitive drum-simulating glass and the charging roller, and the travel direction of the photosensitive drum-simulating glass. As illustrated in FIG. 11A, the discharge region 112 is generated on the upstream side (on the paper) with respect to the travel direction of the photosensitive drum-simulating glass 102. For this discharge light image, the number of pixels corresponding to a discharge width X was measured using image-processing software (product name: Image Pro-Plus manufactured by Media Cybernetics, Inc.) and converted to a discharge distance 114 from the observation magnification.

With a columnar charging roller, the electro-conductive layer portion of the charging member was divided into 4 sections in the longitudinal direction and 4 sections in the circumferential direction for a total of 16 regions, each was measured at an arbitrary location, and the arithmetic mean value of the total 16 regions was calculated as the discharge width. The evaluation results are illustrated in Table 7-2.

1-14. Measurement of Discharge Start Horizontal Distance at Nip Upstream Portion The discharge start horizontal distance was calculated by the following procedure. From the observed image of the discharge light (A in FIG. 11A), an uppermost discharge position 113 was calculated. Subsequently, a center position 115 of the contact region was calculated from the image of the contact between the charging roller and the photosensitive drum-simulating glass (B in FIG. 11B). Using a height coordinate Y1 in the image of the uppermost discharge position 113 and a height coordinate Y2 in the image of the lowermost discharge position, in an observed image 11A, the center position of the contact region was calculated as (Y1+Y2)/2. In the same manner as the measurement of the discharge width X, the image-processing software (product name: Image Pro-Plus, manufactured by Media Cybernetics, Inc.) was used to measure the number of pixels of the distance 114 between the center position 115 of the contact region in FIG. 11B and the uppermost discharge position 113 described above. From the observation magnification, the result was converted to a discharge start horizontal distance L.

With a columnar charging roller, the electro-conductive layer portion of the charging member was divided into 4 sections in the longitudinal direction and 4 sections in the circumferential direction for a total of 16 regions, each was measured at an arbitrary location, and the arithmetic mean value of the total 16 regions was calculated as the discharge start horizontal distance. The evaluation results are illustrated in Table 7-2.

1-15. Image Evaluation

First, as an electrophotographic image forming apparatus, an electrophotographic laser printer (product name: LBP352i, manufactured by Canon) was prepared, which was modified to enable the application of high voltage to the charging member and the developing member respectively from an external power source (product name: Model 615; manufactured by Trek Japan). Next, the charging roller 1, the electrophotographic image forming apparatus, and the process cartridge were left to stand in an environment of 23° C./50% RH for 24 hours with the object of settling into the measurement environment.

In order to carry out evaluations in the high-speed process, the laser printer was modified such that the number of sheets output per unit of time was 75 sheets/min with A4 size paper, which was more than the original number of sheets output. At that time, the output speed of the recording media was set to 370 mm/second and the image resolution was set to 1,200 dpi. Then, a DC voltage of −1000 V was applied to the electro-conductive support of the electro-conductive member. The upper end 10 cm of the image was made into an image such that the character "E" of the alphabet was printed with a size of 4 points such that the coating ratio was 4% of the area of an A4 size sheet of paper. Due to this, unevenness can be formed in which the surface potential of the photosensitive drum after the transfer process, that is, before the charging process, follows the surface potential corresponding to the first "E" character, in a region of approximately one rotation of the photosensitive drum.

Furthermore, a halftone image (an image in which horizontal lines with a width of one dot and an interval of two dots are drawn to be orthogonal to the rotational direction of the photosensitive drum) was output in a portion lower than 10 cm. The following criteria were used to evaluate whether or not the character "E" from one rotation of the photosensitive drum appeared on this halftone image. The evaluation results are illustrated in Table 7-2.

Evaluation of "E" Character on Halftone Image

Rank A: Image unevenness derived from the character "E" is not visible at all on the halftone image even when observed under a microscope.

Rank B: During visual inspection, there is no image unevenness derived from the "E" in some parts of the halftone image; however, when observed under a microscope, image unevenness derived from the character "E" is observed.

Rank C: During visual inspection, the image of the character "E" is visible in a part of the halftone image.

Rank D: During visual inspection, the image of the character "E" is visible on the whole surface of the halftone image.

Preparation of CMB 2 to CMB 8

CMB 2 to CMB 8 were prepared in the same manner as CMB 1, except that the materials described in Table 4 were used in the blending amounts illustrated in Table 4. In addition, the die swell values were calculated in the same manner as for CMB 1.

TABLE 4

| | Second rubber | | | Electro-Conductive particles/ Conductive material | | Vulcanization accelerator aid | | Processing aid | |
|---|---|---|---|---|---|---|---|---|---|
| CMB No. | Type | Grade | Number of parts [parts by mass] | Grade | Number of parts [parts by mass] | Type | Number of parts [parts by mass] | Type | Number of parts [parts by mass] |
| CMB 1 | NBR | N230SL (manufactured by JSR Corporation) | 100 | TOKABLACK #7360SB (manufactured by Tokai Carbon Co., Ltd.) | 60 | Zinc oxide grade two (maufactured by Sakai Chemical Industry Co., Ltd.) | 5 | SZ-2000 (manufactured by Sakai Chemical Industry Co., Ltd.) | 1 |
| CMB 2 | NBR | N230SL (manufactured by JSR Corporation) | 100 | TOKABLACK #5500 (manufactured by Tokai Carbon Co., Ltd.) | 60 | Zinc oxide grade two (maufactured by Sakai Chemical Industry Co., Ltd.) | 5 | SZ-2000 (manufactured by Sakai Chemical Industry Co., Ltd.) | 1 |
| CMB 3 | NBR | N230SL (manufactured by JSR Corporation) | 100 | TOKABLACK #5500 (manufactured by Tokai Carbon Co., Ltd.) | 60 | Zinc oxide grade two (maufactured by Sakai Chemical Industry Co., Ltd.) | 5 | SZ-2000 (manufactured by Sakai Chemical Industry Co., Ltd.) | 1 |
| CMB 4 | NBR | N230SL (manufactured by JSR Corporation) | 100 | TOKABLACK #7360SB (manufactured by Tokai Carbon Co., Ltd.) | 60 | Zinc oxide grade two (maufactured by Sakai Chemical Industry Co., Ltd.) | 5 | SZ-2000 (manufactured by Sakai Chemical Industry Co., Ltd.) | 1 |

TABLE 4-continued

| CMB No. | Second rubber | | | Electro-Conductive particles/ Conductive material | | Vulcanization accelerator aid | | Processing aid | |
|---|---|---|---|---|---|---|---|---|---|
| | Type | Grade | Number of parts [parts by mass] | Grade | Number of parts [parts by mass] | Type | Number of parts [parts by mass] | Type | Number of parts [parts by mass] |
| CMB 5 | NBR | N230SL (manufactured by JSR Corporation) | 100 | TOKABLACK #7360SB (manufactured by Tokai Carbon Co., Ltd.) | 60 | Zinc oxide grade two (maufactured by Sakai Chemical Industry Co., Ltd.) | 5 | SZ-2000 (manufactured by Sakai Chemical Industry Co., Ltd.) | 1 |
| CMB 6 | NBR | Tufdene 2003 (manufactured by Asahi Kasei Corporation) | 100 | TOKABLACK #7360SB (manufactured by Tokai Carbon Co., Ltd.) | 60 | Zinc oxide grade two (maufactured by Sakai Chemical Industry Co., Ltd.) | 5 | SZ-2000 (manufactured by Sakai Chemical Industry Co., Ltd.) | 1 |
| CMB 7 | NBR | N230SL (manufactured by JSR Corporation) | 100 | SN100-P (manufactured by Ishihara Sangyo Kaisha, Ltd.) | 60 | Zinc oxide grade two (maufactured by Sakai Chemical Industry Co., Ltd.) | 5 | SZ-2000 (manufactured by Sakai Chemical Industry Co., Ltd.) | 1 |
| CMB 8 | NBR | Epichlomer CG102 (manufactured by Osaka Soda Co., Ltd.) | 100 | ADK CIZER LV70 (manufactured by Adeka Corporation) | 60 | Zinc oxide grade two (maufactured by Sakai Chemical Industry Co., Ltd.) | 5 | SZ-2000 (manufactured by Sakai Chemical Industry Co., Ltd.) | 1 |

In Table 4, as electro-conductive particles/electro-conductive agents, each grade of "TOKABLACK" manufactured by Tokai Carbon Co., Ltd., represents carbon black particles and "SN100-P" manufactured by Ishihara Sangyo Kaisha, Ltd., represents Sb-doped $SnO_2$ particles. "ADK CIZER LV70" manufactured by Adeka Corporation is an antistatic agent (quaternary ammonium salt).

Preparation of MRC 2 to MRC 9

MRC 2 to MRC 9 were prepared in the same manner as MRC 1, except that the materials described in Table 5 were used in the blending amounts illustrated in Table 5. In addition, the die swell values were calculated in the same manner as for MRC 1.

TABLE 5

| MRC No. | First rubber | | | Filler | | Vulcanization accelerator | | Processing aid | |
|---|---|---|---|---|---|---|---|---|---|
| | Type | Grade | Number of parts [parts by mass] | Grade | Number of parts [parts by mass] | Type | Number of parts [parts by mass] | Type | Number of parts [parts by mass] |
| MRC 1 | SBR | Tufdene 2100R (manufactured by Asashi Kasei Corporation) | 100 | Nanox #30 (manufactured by Maruo Calcium Co., Ltd.) | 40 | Zinc oxide grade two (maufactured by Sakai Chemical Industry Co., Ltd.) | 5 | SZ-2000 (manufactured by Sakai Chemical Industry Co., Ltd.) | 1 |
| MRC 2 | SBR | Tufdene 2003 (manufactured by Asashi Kasei Corporation) | 100 | Nanox #30 (manufactured by Maruo Calcium Co., Ltd.) | 40 | Zinc oxide grade two (maufactured by Sakai Chemical Industry Co., Ltd.) | 5 | SZ-2000 (manufactured by Sakai Chemical Industry Co., Ltd.) | 1 |

TABLE 5-continued

| MRC No. | First rubber Type | First rubber Grade | First rubber Number of parts [parts by mass] | Filler Grade | Filler Number of parts [parts by mass] | Vulcanization accelerator Type | Vulcanization accelerator Number of parts [parts by mass] | Processing aid Type | Processing aid Number of parts [parts by mass] |
|---|---|---|---|---|---|---|---|---|---|
| MRC 3 | SBR | Tufdene 2100R (manufactured by Asashi Kasei Corporation) | 100 | Nanox #30 (manufactured by Maruo Calcium Co., Ltd.) Nipsil VN3 (manufactured by Tosoh Silica Corporation) | 60<br><br>5 | Zinc oxide grade two (maufactured by Sakai Chemical Industry Co., Ltd.) | 5 | SZ-2000 (manufactured by Sakai Chemical Industry Co., Ltd.) | 1 |
| MRC 4 | SBR | Tufdene 2100R (manufactured by Asashi Kasei Corporation) | 100 | Nanox #30 (manufactured by Maruo Calcium Co., Ltd.) Techpolymer MBX-8 (manufactured by Sekisui Kasei Co., Ltd.) | 40<br><br>10 | Zinc oxide grade two (maufactured by Sakai Chemical Industry Co., Ltd.) | 5 | SZ-2000 (manufactured by Sakai Chemical Industry Co., Ltd.) | 1 |
| MRC 5 | SBR | Tufdene 2100R (manufactured by Asashi Kasei Corporation) | 100 | Nanox #30 (manufactured by Maruo Calcium Co., Ltd.) Techpolymer MBX-8 (manufactured by Sekisui Kasei Co., Ltd.) | 40<br><br>10 | Zinc oxide grade two (maufactured by Sakai Chemical Industry Co., Ltd.) | 5 | SZ-2000 (manufactured by Sakai Chemical Industry Co., Ltd.) | 1 |
| MRC 6 | EPDM | EP123 (manufactured by JSR Corporation) | 100 | Nanox #30 (manufactured by Maruo Calcium Co., Ltd.) | 40 | Zinc oxide grade two (maufactured by Sakai Chemical Industry Co., Ltd.) | 5 | SZ-2000 (manufactured by Sakai Chemical Industry Co., Ltd.) | 1 |
| MRC 7 | EPDM | EP33 (manufactured by JSR Corporation) | 100 | Nanox #30 (manufactured by Maruo Calcium Co., Ltd.) | 40 | Zinc oxide grade two (maufactured by Sakai Chemical Industry Co., Ltd.) | 5 | SZ-2000 (manufactured by Sakai Chemical Industry Co., Ltd.) | 1 |
| MRC 8 | BR | BR130B (manufactured by UBE INDUSTRIES, LTD.) | 100 | Nanox #30 (manufactured by Maruo Calcium Co., Ltd.) | 40 | Zinc oxide grade two (maufactured by Sakai Chemical Industry Co., Ltd.) | 5 | SZ-2000 (manufactured by Sakai Chemical Industry Co., Ltd.) | 1 |
| MRC 9 | IR | Nipol IR2200L (manufactured by Zeon Corporation) | 100 | Nanox #30 (manufactured by Maruo Calcium Co., Ltd.) | 40 | Zinc oxide grade two (maufactured by Sakai Chemical Industry Co., Ltd.) | 5 | SZ-2000 (manufactured by Sakai Chemical Industry Co., Ltd.) | 1 |

Preparation of Electro-Conductive Rubber
Compositions 2 to 18 and 20

Electro-conductive rubber compositions 2 to 18 and 20 were produced by the same method as electro-conductive rubber composition 1, except that the starting materials illustrated in Table 6 were used. The parts by mass and physical properties of the starting materials used in the production of each electro-conductive member are illustrated in Table 6.

TABLE 6

| Electro-Conductive rubber composition No. | MRC No. | CMB No. | Domain ratio [%] | Sulfur Number of parts | Vulcanization accelerator 1 Type | Vulcanization accelerator 1 Number of parts | Vulcanization accelerator 2 Type | Vulcanization accelerator 2 Number of parts | Die swell ratio DS(m)/DS(d) |
|---|---|---|---|---|---|---|---|---|---|
| 1 | 1 | 1 | 20 | 3 | TBzTD *1 | 1 | TBSI *2 | 0.5 | 1.22 |
| 2 | 1 | 1 | 25 | 3 | TBzTD | 1 | TBSI | 0.5 | 1.22 |
| 3 | 1 | 1 | 30 | 3 | TBzTD | 1 | TBSI | 0.5 | 1.22 |
| 4 | 1 | 2 | 25 | 3 | TBzTD | 1 | TBSI | 0.5 | 1.30 |
| 5 | 2 | 1 | 25 | 3 | TBzTD | 1 | TBSI | 0.5 | 1.17 |
| 6 | 3 | 1 | 25 | 3 | TBzTD | 1 | TBSI | 0.5 | 1.17 |
| 7 | 4 | 1 | 25 | 3 | TBzTD | 1 | TBSI | 0.5 | 1.16 |
| 8 | 5 | 1 | 25 | 3 | TBzTD | 1 | TBSI | 0.5 | 1.16 |
| 9 | 1 | 3 | 25 | 3 | TBzTD | 1 | TBSI | 0.5 | 1.37 |
| 10 | 1 | 4 | 25 | 3 | TBzTD | 1 | TBSI | 0.5 | 1.27 |
| 11 | 1 | 5 | 25 | 3 | TBzTD | 1 | TBSI | 0.5 | 1.17 |
| 12 | 6 | 1 | 28 | 3 | EP-60 *3 | 4.5 | — | — | 1.13 |
| 13 | 7 | 1 | 28 | 3 | EP-60 | 4.5 | — | — | 1.17 |
| 14 | 8 | 1 | 24 | 3 | TBzTD | 1 | TBSI | 0.5 | 1.14 |
| 15 | 9 | 1 | 23 | 3 | TBzTD | 1 | TBSI | 0.5 | 1.10 |
| 16 | 6 | 6 | 28 | 3 | EP-60 | 4.5 | — | — | 1.24 |
| 17 | 1 | 7 | 27 | 3 | TBzTD | 1 | TBSI | 0.5 | 1.17 |
| 18 | 1 | 1 | 28 | 3 | TBzTD | 1 | TBSI | 0.5 | 1.22 |
| 19 | | | | | Refer to Table 8 | | | | |
| 20 | 1 | 8 | 25 | 3 | TBzTD | 1 | TBSI | 0.5 | 1.00 |
| 21 | | | | | Refer to Table 9 | | | | |
| 22 | | | | | Refer to Table 10 | | | | |

*1 TBzTD . . . Tetrabenzylthiuram disulfide
(Product name: Sanceler TBzTD, manufactured by Sanshin Chemical Industry Co., Ltd)
*2: TBSI . . . N-t-butyl-2-benzothiazolesulfenimide
(Product name: SANTOCURE-TBSI, manufactured by FLEXSYS)
*3: EP-60 . . . Nocceler EP-60
(Product name: manufactured by Ouchi Shinko Chemical Industrial Co., Ltd.)

Examples 2 to 19

Electro-Conductive Members 2 to 19

Electro-conductive members 2 to 19 were produced by the same method as the electro-conductive member 1, except that the starting materials illustrated in Table 6 were used. Table 7-1 illustrates the electro-conductive rubber compositions (MRC, CMB, domain ratio) and die swell ratios during extrusion forming used to produce each electro-conductive member and Table 7-2 illustrates various physical properties and image evaluation results. The domain ratio is the mass ratio [CMB/(MRC+CMB)] of the rubber composition for forming a domain with respect to the total rubber composition, expressed as a percentage.

TABLE 7-1

| Example No. | Electro-Conductive Member No. | Member | Electro-Conductive rubber composition No. | MRC No. | CMB No. | Domain ratio [%] | Die swell ratio DS(m)/DS(d) |
|---|---|---|---|---|---|---|---|
| 1 | 1 | Charging | 1 | 1 | 1 | 20 | 1.22 |
| 2 | 2 | Charging | 2 | 1 | 1 | 25 | 1.22 |
| 3 | 3 | Charging | 3 | 1 | 1 | 30 | 1.22 |

TABLE 7-1-continued

| Example No. | Electro-Conductive Member No. | Member | Electro-Conductive rubber composition No. | MRC No. | CMB No. | Domain ratio [%] | Die swell ratio DS(m)/DS(d) |
|---|---|---|---|---|---|---|---|
| 4 | 4 | Charging | 2 | 1 | 1 | 25 | 1.22 |
| 5 | 5 | Charging | 4 | 1 | 2 | 25 | 1.30 |
| 6 | 6 | Charging | 5 | 2 | 1 | 25 | 1.17 |
| 7 | 7 | Charging | 6 | 3 | 1 | 25 | 1.17 |
| 8 | 8 | Charging | 7 | 4 | 1 | 25 | 1.16 |
| 9 | 9 | Charging | 8 | 5 | 1 | 25 | 1.16 |
| 10 | 10 | Charging | 9 | 1 | 3 | 25 | 1.37 |
| 11 | 11 | Charging | 10 | 1 | 4 | 25 | 1.27 |
| 12 | 12 | Charging | 11 | 1 | 5 | 25 | 1.12 |
| 13 | 13 | Charging | 12 | 6 | 1 | 28 | 1.13 |
| 14 | 14 | Charging | 13 | 7 | 1 | 28 | 1.17 |
| 15 | 15 | Charging | 14 | 8 | 1 | 24 | 1.14 |
| 16 | 16 | Charging | 15 | 9 | 1 | 23 | 1.09 |
| 17 | 17 | Charging | 16 | 6 | 6 | 28 | 1.24 |
| 18 | 18 | Charging | 17 | 1 | 7 | 27 | 1.14 |
| 19 | 19 | Transfer | 18 | 1 | 1 | 28 | 1.22 |

TABLE 7-2

| Example No. | Volume resistance of matrix [Ωcm] | Volume resistance of electro-conductive member [Ωcm] | Domain exposure rate in concave portion [%] | Domain depth [μm] | A2/A1 | Domain diameter D [μm] | Inter-domain distance [μm] | Discharge width [μm] | Discharge start horizontal distance [μm] | Image evaluation rank |
|---|---|---|---|---|---|---|---|---|---|---|
| 1 | 4.9E+14 | 3.2E+07 | 55 | 2.2 | 82 | 1.6 | 2.9 | 500 | 1900 | B |
| 2 | 4.9E+14 | 4.7E+06 | 58 | 2.6 | 84 | 1.6 | 2.3 | 520 | 1900 | B |
| 3 | 4.9E+14 | 8.8E+05 | 51 | 2.8 | 86 | 1.6 | 1.2 | 530 | 1900 | B |
| 4 | 4.9E+14 | 5.5E+06 | 59 | 2.6 | 80 | 1.6 | 2.3 | 520 | 1900 | B |
| 5 | 4.9E+14 | 4.4E+05 | 70 | 4.7 | 234 | 1.6 | 2.3 | 590 | 1890 | A |
| 6 | 5.3E+14 | 7.2E+06 | 56 | 2.0 | 96 | 2.1 | 2.2 | 500 | 1900 | B |
| 7 | 7.3E+14 | 8.2E+06 | 50 | 2.0 | 154 | 1.6 | 2.3 | 500 | 1900 | B |
| 8 | 9.1E+14 | 1.1E+07 | 51 | 1.7 | 120 | 2.7 | 1.9 | 490 | 1900 | B |
| 9 | 8.9E+14 | 9.1E+06 | 52 | 1.6 | 114 | 2.3 | 2.1 | 480 | 1900 | B |
| 10 | 4.9E+14 | 1.9E+05 | 84 | 7.0 | 170 | 2.2 | 2.1 | 620 | 1890 | A |
| 11 | 4.9E+14 | 1.3E+06 | 66 | 4.2 | 180 | 3.3 | 1.9 | 580 | 1900 | A |
| 12 | 4.9E+14 | 8.8E+07 | 40 | 0.8 | 20 | 2.1 | 2.2 | 470 | 1900 | C |
| 13 | 3.9E+15 | 9.4E+06 | 41 | 1.1 | 113 | 2.5 | 2.1 | 475 | 1900 | B |
| 14 | 2.4E+15 | 1.3E+07 | 54 | 2.0 | 120 | 2.8 | 1.7 | 480 | 1900 | B |
| 15 | 6.6E+13 | 1.1E+06 | 43 | 1.3 | 62 | 3.4 | 1.6 | 470 | 1900 | C |
| 16 | 1.1E+12 | 2.3E+05 | 34 | 0.9 | 34 | 3.4 | 2.3 | 475 | 1900 | C |
| 17 | 3.9E+15 | 5.2E+05 | 60 | 3.4 | 280 | 2.7 | 2.4 | 540 | 1900 | B |
| 18 | 4.9E+14 | 5.5E+07 | 43 | 1.2 | 70 | 3.5 | 1.6 | 470 | 1900 | C |
| 19 | 4.9E+14 | 4.7E+06 | 59 | 2.6 | 84 | 2.4 | 1.7 | 490 | 1900 | B |

Comparative Examples

Comparative Example 1

Production of Electro-Conductive Member 20

An electro-conductive member 20 was produced in the same manner as in Example 2, except that an electro-conductive rubber composition 2 was used, the outer diameter at the time of extrusion was changed to 9.0 mm at the center, and an additional polishing step was performed after the extrusion.

The polishing step was performed under the following conditions. An elastic roller with an outer diameter of 9.0 mm was formed to be 8.5 mm with a crown amount of 100 μm. The conditions for the polishing process were as follows: a grinding wheel rotation speed of 2100 rpm, an elastic roller rotation speed of 250 rpm, and, as a rough grinding step, the grinding wheel penetrated 0.24 mm into the elastic roller at a penetration speed of 20 mm/sec after contacting the outer circumferential surface of the elastic roller. As a precision polishing step, the penetration speed was changed to 0.2 mm/sec and, after penetrating 0.01 mm, the grinding wheel was applied at that position for 4 seconds and then the grinding wheel was separated from the roller. In addition, an upper cutting method was used, in which the polishing grinding wheel and the rubber roller were rotated in the same direction. For the grinding wheel, a porous grinding wheel formed of abrasive grains of GC80 (manufactured by TEIKEN Co., Ltd.) with a width of 235 mm and a diameter of φ305 mm in size was used.

Table 11-1 illustrates details regarding the manufacturing of the electro-conductive member 20 and Table 11-2 illustrates various physical properties and image evaluation results.

When the image evaluation was carried out, the result was Rank D. This was because the exposed domains on the outer surface were not concave portions, thus, the discharge width could not be expanded to the nip vicinity side and the potential equalization effect was not sufficient.

Comparative Example 2

Preparation of Electro-Conductive Rubber Composition 19

A blending agent 1 in Table 8 below was mixed under the following conditions. A 6-liter pressurized kneader (product name: TD6-15MDX, manufactured by Toshinsha Co., Ltd.) was used as the mixer. The mixing conditions were set to a filling ratio of 70 vol %, a blade rotation speed of 30 rpm, and 16 minutes.

Thereafter, the obtained rubber composition and a blending agent 2 illustrated in Table 8 were mixed in an open roll to prepare an electro-conductive rubber composition 19. As the mixer, an open roll with a roll diameter of 12 inches was used. The mixing conditions were a front roll rotation speed of 10 rpm, a rear roll rotation speed of 8 rpm, and a roll gap of 2 mm, and, after a total of 20 left and right turns were performed, 10 thin passes were performed with a roll gap of 0.5 mm.

Comparative Example 3

Production of Electro-Conductive Member 22

Production was carried out by the same method as the electro-conductive member 1, except that the electro-conductive rubber composition 20 was used. Table 11-1 illustrates the details regarding the manufacturing of an electro-conductive member 22 and Table 11-2 illustrates various physical properties and image evaluation results.

When the image of the electro-conductive member 22 was evaluated, the result was Rank D. This was because the MRC/CMB of the electro-conductive rubber composition was 1.00, thus, in the electro-conductive member 22, the exposed domains on the outer surface were not in concave portions. Therefore, the discharge width could not be expanded and the potential equalization effect was not sufficient.

TABLE 8

| | | Material | Blending amount (parts by mass) |
|---|---|---|---|
| Blending agent 1 | Rubber | Acrylonitrile butadiene rubber (NBR) (Product name: N230SL, manufactured by JSR Corporation) | 100 |
| | Electro-Conductive particles | Carbon black (Product name: TOKABLACK #7360SB, manufactured by Tokai Carbon Co., Ltd.) | 48 |
| | Filler | Calcium carbonate (Product name: Nanox #30, manufactured by Maruo Calcium Co., Ltd.) | 15 |
| | Vulcanization accelerator aid | Zinc oxide (Product name: Zinc oxide grade two, manufactured by Sakai Chemical Industry Co., Ltd.) | 5 |
| | Processing aid | Zinc stearate (Product name: SZ-2000, manufactured by Sakai Chemical Industry Co., Ltd.) | 1 |
| Blending agent 2 | Vulcanization agent | Sulfur (Product name: SULFAX PMC, sulfur content 97.5%, manufactured by Tsurumi Chemical Industry Co., Ltd.) | 3 |
| | Vulcanization accelerator 1 | Tetrabenzylthiuram disulfide (Product name: SANCELER TBzTD, manufactured by Sanshin Chemical Industry Co., Ltd.) | 1 |
| | Vulcanization accelerator 2 | N-t-butyl-2-benzothiazolsulfenimkle (Product name: SANTOCURE-TBSI, manufactured by FLEXSYS) | 0.5 |

Production of Electro-Conductive Member 21

Production was carried out by the same method as the electro-conductive member 1, except that an electro-conductive rubber composition 19 was used. Table 11-1 illustrates the details regarding the manufacturing of an electro-conductive member 21 and Table 11-2 illustrates various physical properties and image evaluation results.

When the image of the electro-conductive member 21 was evaluated, the result was Rank D. Since the electro-conductive member 21 did not have a matrix-domain structure and the domains were not in the concave portions, the discharge width could not be expanded by fine discharge, thus, the potential equalization effect was not sufficient.

Comparative Example 4

Preparation of Electro-Conductive Rubber Composition 21

The blending agent 1 in Table 9 below was mixed under the following conditions. A 6-liter pressurized kneader (product name: TD6-15MDX, manufactured by Toshinsha Co., Ltd.) was used as the mixer. The mixing conditions were set to a filling ratio of 70 vol %, a blade rotation speed of 30 rpm, and 16 minutes.

Thereafter, the obtained rubber composition and a blending agent 2 illustrated in Table 9 were mixed in an open roll to prepare an electro-conductive rubber composition 21. As the mixer, an open roll with a roll diameter of 12 inches was used. The mixing conditions were a front roll rotation speed of 10 rpm, a rear roll rotation speed of 8 rpm, and a roll gap of 2 mm, and, after a total of 20 left and right turns were performed, 10 thin passes were performed with a roll gap of 0.5 mm.

TABLE 9

|  |  | Material | Blending amount (parts by mass) |
|---|---|---|---|
| Blending agent 1 | Rubber | Acrylonitrile butadiene rubber (NBR) (Product name: N230SL, manufactured by JSR Corporation) | 100 |
|  | Electro-Conductive particles | Carbon black (Product name: TOKABLACK #7360SB, manufactured by Tokai Carbon Co., Ltd.) | 48 |
|  | Filler 1 | Calcium carbonate (Product name: Nanox #30, manufactured by Maruo Calcium Co., Ltd.) | 15 |
|  | Filler 2 | Spherical carbon particles (Product name: NICABEADS ICB-1020) | 10 |
|  | Vulcanization accelerator aid | Zinc oxide (Product name: Zinc oxide grade two, manufactured by Sakai Chemical Industry Co., Ltd.) | 5 |
|  | Processing aid | Zinc stearate (Product name: SZ-2000, manufactured by Sakai Chemical Industry Co., Ltd.) | 1 |
| Blending agent 2 | Vulcanization agent | Sulfur (Product name: SULFAX PMC, sulfur content 97.5%, manufactured by Tsurumi Chemical Industry Co., Ltd.) | 3 |
|  | Vulcanization accelerator 1 | Tetrabenzylthiuram disulfide (Product name: SANCELER TBzTD, manufactured by Sanshin Chemical Industry Co., Ltd.) | 1 |
|  | Vulcanization accelerator 2 | N-t-butyl-2-benzothiazolsulfenimide (Product name: SANTOCURE-TBSI, manufactured by FLEXSYS) | 0.5 |

Electro-Conductive Member 23

An electro-conductive member 23 was produced in the same manner as in Example 2, except that the electro-conductive rubber composition 21 was used, the outer diameter at the time of extrusion was changed to 9.0 mm at the center, and an additional polishing step was performed after the extrusion.

The polishing step was performed under the following conditions. An elastic roller with an outer diameter of 9.0 mm was formed to be 8.5 mm with a crown amount of 100 µm. The conditions for the polishing process were as follows: a grinding wheel rotation speed of 2100 rpm, an elastic roller rotation speed of 250 rpm, and, as a rough grinding step, the grinding wheel penetrated 0.24 mm into the elastic roller at a penetration speed of 20 mm/sec after contacting the outer circumferential surface of the elastic roller. As a precision polishing step, the penetration speed was changed to 0.2 mm/sec and, after penetrating 0.01 mm, the grinding wheel was separated from the elastic roller to complete the polishing process. In addition, an upper cutting method was used, in which the polishing grinding wheel and the rubber roller were rotated in the same direction. For the grinding wheel, a porous grinding wheel formed of abrasive grains of GC80 (manufactured by TEIKEN Co., Ltd.) with a width of 235 mm and a diameter of φ305 mm in size was used.

Table 11-1 illustrates the details regarding the manufacturing of the electro-conductive member 23 and Table 11-2 illustrates various physical properties and image evaluation results.

When the image evaluation was carried out, the result was Rank D. This is because although the discharge width of the electro-conductive member 23 was expanded by the electro-conductive convex portion derived from the spherical carbon particles, the discharge start horizontal distance to the upstream side of the nip was large and the discharge expanded to the upstream side of the nip instead of the nip vicinity side, thus, abnormal discharge was generated and the potential equalization effect by fine discharge was not sufficient.

Comparative Example 5

Preparation of Electro-Conductive Rubber Composition 22

The blending agent 1 in Table 10 below was mixed under the following conditions. A 6-liter pressurized kneader (product name: TD6-15MDX, manufactured by Toshinsha Co., Ltd.) was used as the mixer. The mixing conditions were set to a filling ratio of 70 vol %, a blade rotation speed of 30 rpm, and 16 minutes.

Then, the obtained rubber composition and the blending agent 2 illustrated in Table 10 were mixed in an open roll to prepare an electro-conductive rubber composition 22. As the mixer, an open roll with a roll diameter of 12 inches was used. The mixing conditions were a front roll rotation speed of 10 rpm, a rear roll rotation speed of 8 rpm, and a roll gap of 2 mm, and, after a total of 20 left and right turns were performed, 10 thin passes were performed with a roll gap of 0.5 mm.

TABLE 10

|  | Material | Blending amount (parts by mass) |
|---|---|---|
| Blending agent 1 | Rubber — Epichlorohydrin rubber (EO-EP-AGE ternary compound) (Product name: CG102, manufactured by Osaka Soda Co., Ltd.) | 100 |
|  | Electro-Conductive agent — Quaternary ammonium salt (Product name: ADK CIZER LV70 manufactured by Adeka Corporation) | 3 |
|  | Filler 1 — Calcium carbonate (Product name: Nanox #30, manufactured by Maruo Calcium Co., Ltd.) | 60 |
|  | Plasticizer — Aliphatic polyester-based plasticizer (Product name: Polycizer P-202, manufactured by DIC Corporation) | 10 |
|  | Vulcanization accelerator aid — Zinc oxide (Product name: Zinc oxide grade two, manufactured by Sakai Chemical Industry Co., Ltd.) | 5 |
|  | Processing aid — Zinc stearate (Product name: SZ-2000, manufactured by Sakai Chemical Industry Co., Ltd.) | 1 |
| Blending agent 2 | Vulcanization agent — Sulfur (Product name: SULFAX PMC, sulfur content 97.5%, manufactured by Tsurumi Chemical Industry Co., Ltd.) | 1.8 |
|  | Vulcanization accelerator 1 — Tetramethylthiurammonosulfide (Product name: Nocceler TS, manufactured by Ouchi Shinko Chemical Industrial Co., Ltd.) | 1 |
|  | Vulcanization accelerator 2 — Di-2-benzothiazolyldisulfide (DM) (Product name: Nocceler DM-P (DM), manufactured by Ouchi Shinko Chemical Industrial Co., Ltd.) | 1 |

Electro-Conductive Member 24

An elastic layer was produced by the same method as the electro-conductive member 1, except that the electro-conductive rubber composition 22 was used to manufacture an elastic roller. An electro-conductive member 24 was produced by forming a surface layer using the following method.

As the first resin, a nylon resin (N-methoxymethylated nylon, product name: FR101, manufactured by Namariichi) was dissolved in a methanol, 1-butanol mixture (methanol: 1-butanol=3:1 (mass ratio)) and adjusted to a solid content concentration of 8% by mass. 10 parts by mass of polystyrene (product name: Styrene Monomer, manufactured by SunLight Co., Ltd.) as the second resin, 12 parts by mass of carbon black (product name: MONARCH 880, manufactured by Cabot), and 2 parts by mass of hardening agent (citric acid) were added to 100 parts by mass of the dissolved solution described above and the mixture was dispersed in a bead mill and diluted with methanol to obtain a dispersion solution. The elastic roller described above was coated with the dispersion solution by immersion and heated and dried for 20 minutes at 160° C. to form a surface layer.

Table 11-1 illustrates the details regarding the manufacturing of the electro-conductive member 24 and Table 11-2 illustrates various physical properties and image evaluation results.

When the image evaluation was carried out, the result was Rank D. The electro-conductive member 24 had a matrix-domain structure in the surface layer and the electro-conductive agent was unevenly distributed in the domain portions. However, the exposed domains on the outer surface were not in concave portions, thus, the discharge width could not be expanded to the nip vicinity side, and, since the elastic layer did not form a matrix-domain structure, the potential equalization effect by fine discharge was insufficient.

TABLE 11-1

| Comparative Example No. | Electro-Conductive member No. | Electro-Conductive rubber composition No. | MRC No. | CMB No. | Domain ratio [%] | Additional step after extrusion | Process after forming | Die swell ratio DS(m)/DS(d) |
|---|---|---|---|---|---|---|---|---|
| 1 | 20 | 2 | 1 | 1 | 25 | Polishing | UV (ultraviolet light) | 1.22 |
| 2 | 21 | 19 | — | — | — | None | UV | — |
| 3 | 22 | 20 | 1 | 8 | 25 | None | UV | 1.00 |
| 4 | 23 | 21 | — | — | — | Polishing | UV | — |
| 5 | 24 | 22 | — | — | — | None | Surface layer formation | — |

TABLE 11-2

| Comparative example No. | Volume resistance of matrix [Ωcm] | Volume resistance of electro-conductive member [Ωcm] | Domain exposure rate in concave portion [%] | Domain depth [μm] | A2/A1 | Domain diameter D [μm] | Inter-domain distance [μm] | Discharge width [μm] | Discharge start horizontal distance [μm] | Image evaluation rank |
|---|---|---|---|---|---|---|---|---|---|---|
| 1 | 3.4E+15 | 2.6E+07 | 0 | 0.0 | 80 | 2.1 | 2.8 | 450 | 1900 | D |
| 2 | — | 5.5E+05 | — | — | — | — | — | 460 | 1910 | D |
| 3 | 4.9E+14 | 7.8E+07 | 0 | 0.0 | 50 | 3.3 | 2.6 | 450 | 1900 | D |
| 4 | — | 2.2E+05 | — | — | — | — | — | 500 | 1970 | D |
| 5 | — | 8.8E+07 | — | — | 200 | 5.6 | 3.3 | 450 | 1900 | D |

According to one aspect of the present disclosure, an electro-conductive member can be provided which can stably provide high-quality images without generating ghost images even in a case of being applied to a high-speed electrophotographic image forming process. Furthermore, according to another aspect of the present disclosure, an electrophotographic image forming apparatus which can form high-quality electrophotographic images can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electro-conductive member comprising:
an electro-conductive support; and
an electro-conductive layer,
wherein the electro-conductive layer is a surface layer of the electro-conductive member, and is constituted by a single layer,
the electro-conductive layer has a matrix including a first rubber cross-linked product and domains dispersed in the matrix,
each of the domains includes a second rubber cross-linked product and electro-conductive particles,
an outer surface of the electro-conductive member has concave portions,
a surface of at least a part of the domains is exposed to the outer surface of the electro-conductive member at bottom portions of the concave portions,
a volume resistivity of the matrix is greater than $1.0 \times 10^{12}$ Ωcm,
a volume resistivity of the electro-conductive layer is $1.0 \times 10^5$ Ωcm or more to $1.0 \times 10^8$ Ωcm or less, and wherein
A2 is 20 times or more of A1
where A1 is a current value when a DC voltage of 80 V is applied between the electro-conductive support and a cantilever of an atomic force microscope which is in contact with a surface of the matrix, constituting the outer surface of the electro-conductive member, and
A2 is a current value when a DC voltage of 80 V is applied between the electro-conductive support and a cantilever of an atomic force microscope which is in contact with surfaces of the domains, constituting the outer surface of the electro-conductive member.

2. The electro-conductive member according to claim 1, wherein among the domains present on the outer surface, a ratio of the domains exposed on the outer surface of the electro-conductive member at the bottom portions of the concave portion is 50% or more.

3. The electro-conductive member according to claim 1, wherein the first rubber is styrene-butadiene rubber.

4. An electrophotographic image forming apparatus comprising:
an electrophotographic photosensitive member; and
a charging member arranged to enable charging of the electrophotographic photosensitive member,
wherein the charging member is an electro-conductive member comprising:
an electro-conductive support; and
an electro-conductive layer,
wherein the electro-conductive layer is a surface layer of the electro-conductive member, and is constituted by a single layer,
the electro-conductive layer has a matrix including a first rubber cross-linked product and domains dispersed in the matrix,
each of the domains includes a second rubber cross-linked product and electro-conductive particles,
an outer surface of the electro-conductive member has concave portions,
a surface of at least a part of the domains is exposed to the outer surface of the electro-conductive member at bottom portions of the concave portions,
a volume resistivity of the matrix is greater than $1.0 \times 10^{12}$ Ωcm,
a volume resistivity of the electro-conductive layer is $1.0 \times 10^5$ Ωcm or more to $1.0 \times 10^8$ Ωcm or less, and wherein
A2 is 20 times or more of A1
where A1 is a current value when a DC voltage of 80 V is applied between the electro-conductive support and a cantilever of an atomic force microscope which is in contact with a surface of the matrix, constituting the outer surface of the electro-conductive member, and
A2 is a current value when a DC voltage of 80 V is applied between the electro-conductive support and a cantilever of an atomic force microscope which is in contact with surfaces of the domains, constituting the outer surface of the electro-conductive member.

5. A process cartridge which is attachable to and detachable from a main body of an electrophotographic image forming apparatus, the process cartridge comprising:
an electrophotographic photosensitive member; and
a charging member arranged to enable charging of the electrophotographic photosensitive member,
wherein the charging member is an electro-conductive member comprising:

an electro-conductive support; and
an electro-conductive layer,
wherein the electro-conductive layer is a surface layer of the electro-conductive member, and is constituted by a single layer,
the electro-conductive layer has a matrix including a first rubber cross-linked product and domains dispersed in the matrix,
each of the domains includes a second rubber cross-linked product and electro-conductive particles,
an outer surface of the electro-conductive member has concave portions,
a surface of at least a part of the domains is exposed to the outer surface of the electro-conductive member at bottom portions of the concave portions,
a volume resistivity of the matrix is greater than $1.0 \times 10^{12}$ Ωcm,
a volume resistivity of the electro-conductive layer is $1.0 \times 10^5$ Ωcm or more to $1.0 \times 10^8$ Ωcm or less, and wherein
A2 is 20 times or more of A1
where A1 is a current value when a DC voltage of 80 V is applied between the electro-conductive support and a cantilever of an atomic force microscope which is in contact with a surface of the matrix, constituting the outer surface of the electro-conductive member, and
A2 is a current value when a DC voltage of 80 V is applied between the electro-conductive support and a cantilever of an atomic force microscope which is in contact with surfaces of the domains, constituting the outer surface of the electro-conductive member.

6. A manufacturing method of an electro-conductive member, the method comprising the following steps (A) to (D):

(A) providing a rubber composition for forming a domain including the electro-conductive particles and the second rubber;

(B) providing a rubber composition for forming a matrix including the first rubber;

(C) kneading the rubber composition for forming a domain and the rubber composition for forming a matrix to prepare a rubber composition having a matrix-domain structure; and (D) extruding the rubber composition having the matrix-domain structure together with an electro-conductive support from a crosshead to coat a periphery of the electro-conductive support with the rubber composition having the matrix-domain structure, wherein, a ratio of die swell values DS(m)/DS(d) is greater than 1.00, where DS(d) is a die swell value of the rubber composition for forming a domain, and DS(m) is a die swell value of the rubber composition for forming a matrix, and wherein the electro-conductive member comprising:
an electro-conductive support; and
an electro-conductive layer,
wherein the electro-conductive layer is a surface layer of the electro-conductive member, and is constituted by a single layer,
the electro-conductive layer has a matrix including a first rubber cross-linked product and domains dispersed in the matrix,
each of the domains includes a second rubber cross-linked product and electro-conductive particles,
an outer surface of the electro-conductive member has concave portions,
a surface of at least a part of the domains is exposed to the outer surface of the electro-conductive member at bottom portions of the concave portions,
a volume resistivity of the matrix is greater than $1.0 \times 10^{12}$ Ωcm,
a volume resistivity of the electro-conductive layer is $1.0 \times 10^5$ Ωcm or more to $1.0 \times 10^8$ Ωcm or less, and wherein
A2 is 20 times or more of A1
where A1 is a current value when a DC voltage of 80 V is applied between the electro-conductive support and a cantilever of an atomic force microscope which is in contact with a surface of the matrix, constituting the outer surface of the electro-conductive member, and
A2 is a current value when a DC voltage of 80 V is applied between the electro-conductive support and a cantilever of an atomic force microscope which is in contact with surfaces of the domains, constituting the outer surface of the electro-conductive member.

7. The method for manufacturing an electro-conductive member according to claim 6,
wherein DS(m)/DS(d) is 1.15 or more.

* * * * *